United States Patent
Raby et al.

(10) Patent No.: US 11,291,526 B2
(45) Date of Patent: Apr. 5, 2022

(54) PARYLENE DENTAL ARTICLES

(71) Applicant: 3M INNOVATIVE PROPERTIES COMPANY, St. Paul, MN (US)

(72) Inventors: Richard E. Raby, Lino Lakes, MN (US); Zeba Parkar, Marietta, GA (US); Ta-Hua Yu, Woodbury, MN (US); Moses M. David, Wells, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/279,135

(22) PCT Filed: Sep. 24, 2019

(86) PCT No.: PCT/IB2019/058105
§ 371 (c)(1),
(2) Date: Mar. 24, 2021

(87) PCT Pub. No.: WO2020/065538
PCT Pub. Date: Apr. 2, 2020

(65) Prior Publication Data
US 2021/0353386 A1    Nov. 18, 2021

Related U.S. Application Data

(60) Provisional application No. 62/736,774, filed on Sep. 26, 2018.

(51) Int. Cl.
| | | |
|---|---|---|
| A61C 7/08 | (2006.01) |
| A61C 7/00 | (2006.01) |
| A61C 7/10 | (2006.01) |
| B29C 41/00 | (2006.01) |
| B29C 41/42 | (2006.01) |

(52) U.S. Cl.
CPC ............... *A61C 7/08* (2013.01); *A61C 7/002* (2013.01); *A61C 7/10* (2013.01); *B29C 41/003* (2013.01); *B29C 41/42* (2013.01); *B29K 2065/00* (2013.01)

(58) Field of Classification Search
None
See application file for complete search history.

(56) References Cited

U.S. PATENT DOCUMENTS

| | | | |
|---|---|---|---|
| 5,205,736 A | 4/1993 | Blechman |
| 5,334,015 A | 8/1994 | Blechman |
| 6,746,773 B2 | 6/2004 | Llanos |
| 6,845,175 B2 | 1/2005 | Kopelman |
| 7,027,642 B2 | 4/2006 | Rubbert |
| 7,234,937 B2 | 6/2007 | Sachdeva |
| 7,541,048 B2 | 6/2009 | DeWitt |
| 7,731,495 B2 | 6/2010 | Eisenberg |
| 7,857,618 B2 | 12/2010 | Abels |
| 8,194,067 B2 | 6/2012 | Raby |
| 8,491,306 B2 | 7/2013 | Raby |
| 8,738,165 B2 | 5/2014 | Cinader, Jr |
| 8,778,444 B2 | 7/2014 | Kim |
| 8,897,902 B2 | 11/2014 | See |
| 9,949,809 B2 | 4/2018 | Lewis |
| 2004/0029068 A1 | 2/2004 | Sachdeva |
| 2006/0199153 A1 | 9/2006 | Liu |
| 2007/0031791 A1 | 2/2007 | Cinader Jr. |
| 2009/0061378 A1 | 3/2009 | Kim |
| 2011/0220612 A1 | 9/2011 | Kim |
| 2014/0236080 A1 | 8/2014 | Pierstorff |
| 2014/0295377 A1 | 10/2014 | Lewis |
| 2016/0237541 A1 | 8/2016 | Patel |
| 2016/0256243 A1 | 9/2016 | Kim |
| 2017/0079750 A1 | 3/2017 | Blackburn |

FOREIGN PATENT DOCUMENTS

| | | |
|---|---|---|
| CN | 101398614 | 4/2009 |
| EP | 1468657 A2 | 10/2004 |
| EP | 2167013 | 3/2010 |
| KR | 20070015629 | 2/2007 |
| KR | 20090015009 | 2/2009 |
| KR | 101297644 | 8/2013 |
| WO | WO 2007-013116 | 2/2007 |
| WO | WO 2007-084727 | 7/2007 |
| WO | WO 2008-088146 | 7/2008 |
| WO | WO 2009-029781 | 3/2009 |
| WO | WO 2009-068145 | 6/2009 |
| WO | WO 2014-011731 | 1/2014 |
| WO | WO 2019-023166 | 1/2019 |
| WO | WO 2019-239286 | 12/2019 |

OTHER PUBLICATIONS

Deposition Process-Parylene, Parylene Engineering, [retrieved from the internet on Apr. 10, 2017], URL<http://www.paryleneengineering.com/parylene_deposition_process.htm on Oct. 4, 2017, 2 pages.
Gensler, "An Implantable MEMS Micropump System for Drug Delivery in Small Animals", Biomedical Microdevices, Jun. 2021, vol. 14, No. 3, pp. 483-496.
International Search Report for PCT International Application No. PCT/IB2019/058105, dated Nov. 28, 2019, 5 pages.

*Primary Examiner* — Tae H Yoon
(74) *Attorney, Agent, or Firm* — 3M IPC

(57) ABSTRACT

A dental article includes at least one segment defining a complex three-dimensional shape configured to follow contours of an oral anatomy, in which the at least one segment includes a core component including a majority of parylene.

20 Claims, 12 Drawing Sheets

PARYLENE DENTAL ARTICLES

CROSS REFERENCE TO RELATED APPLICATIONS

This application is a national stage filing under 35 U.S.C. 371 of PCT/IB2019/058105, filed 24 Sep. 2019, which claims the benefit of U.S. Provisional Application No. 62/736,774, filed 26 Sep. 2018, the disclosures of which are incorporated by reference in their entireties herein.

TECHNICAL FIELD

The present disclosure relates to polymer-based dental articles such as teeth aligners.

BACKGROUND

The field of orthodontics relates to the supervision, guidance and correction of teeth towards proper positions in the oral cavity. Various orthodontic devices and treatment methods have been developed to address dental alignment issues. Traditional approaches generally involve the application of forces to move teeth into a proper bite configuration, or occlusion. One mode of therapy includes the use of fixed appliances attached to the teeth of a patient and, using an archwire, applying therapeutic forces to move the teeth from initial positions to selected positions. Such dental appliances remain in the mouth of the patient and are periodically adjusted by an orthodontist to check the process and maintain the proper pressure against the teeth until proper alignment is achieved.

SUMMARY

The disclosure relates to dental articles such as dental aligners that include a segment having a core component including a majority of parylene. Parylene has been found to possess several beneficial properties in the production of dental articles including, for example, desirable mechanical properties even after a prolonged exposure to aqueous environments, optical and aesthetic properties, biocompatibility, anti-staining properties, and the like. In addition to the above, the manufacturing process to produce parylene is clean and precise, resulting in a reduced or substantially eliminated introduction of impurities into the dental article and a high degree of thickness uniformity in the resulting dental article compared to the production of such articles using other materials or manufacturing techniques. The described features may lead to dental articles with greater customization and control during the production of complex dental articles.

In some examples, the disclosure describes a dental article that includes at least one segment defining a complex three-dimensional shape configured to follow contours of an oral anatomy, in which the at least one segment includes a core component including a majority of parylene.

In some examples, the disclosure describes a method including forming a three-dimensional model of an oral anatomy of a patient and forming a dental article including at least one segment defining a complex three-dimensional shape configured to follow contours of the oral anatomy. Forming the at least one segment includes depositing a layer comprising parylene on the model in which the layer includes a majority of parylene, and using the layer including parylene to form a core component of the at least one segment.

In some examples, the disclosure describes a dental article including at least one segment defining a complex three-dimensional shape configured to follow contours of an oral anatomy in which the at least one segment comprises a core component, where the core component is formed by depositing parylene from a chemical vapor deposition process over a model of an oral anatomy.

In some examples, the disclosure describes a method including receiving, by a computing device, a digital representation of a three-dimensional (3D) oral anatomy of a patient, the oral anatomy providing initial positions of one or more teeth of the patient; determining, by the computing device, dimensions and shapes for a dental article for the patient, where the dental article comprises at least one segment configured to at least partially surround a plurality of teeth to define complex 3D shape configured to follow contours of the oral anatomy, where the dimensions and shapes of the dental article are configured to reposition the one or more teeth of the patient from their initial positions to adjusted positions when the dental article is worn by the patient; forming a 3D model of an oral anatomy based on the dimensions and shapes for the dental article; and forming the dental article, in which forming the at least one segment of the dental article includes depositing a layer including parylene on the 3D model, where the layer comprises a majority of parylene, and trimming the layer including parylene to a selected shape to form a core component of the at least one segment.

The details of one or more examples are set forth in the accompanying drawings and the description below. Other features, objects, and advantages will be apparent from the description and drawings, and from the claims.

DETAILED DESCRIPTION

Figure 1:
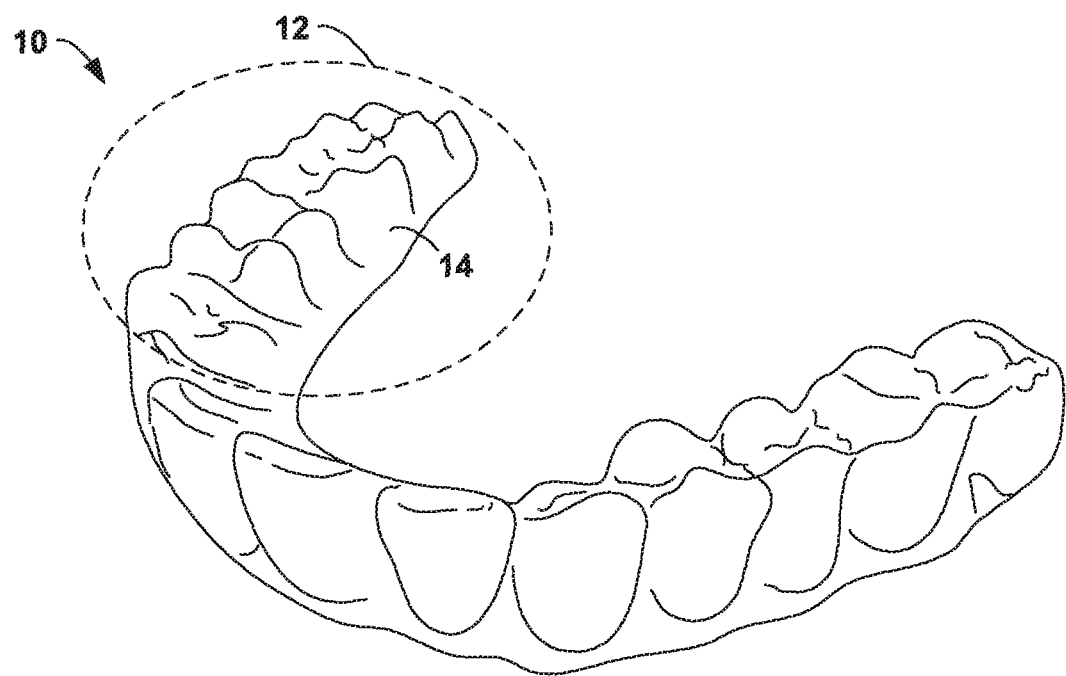
FIG. 1 is a perspective view of an example dental article with at least one segment of the dental article including a core component including a majority of parylene.

The disclosure relates to dental articles that include a segment of the article having a core component including a majority of parylene, and methods for making the same. Such dental articles may include for example, dental tray aligners, night guards, retainers, mouthguards, palatal expanders, custom force members and attachment points, spring aligners, dental articles incorporating archwires, arch members, elastic bands and springs, brackets and other bonded appliances, dental crowns, implants, dentures, partials, temporary replacements, trays for delivering therapeutic agents, or the like. The disclosure primarily focuses on and describes dental articles that include at least one segment having a shape that follows the complex contours of the oral anatomy of a patient such as a dental tray aligner or palatal expander. However, many other dental articles may be constructed using the components and techniques described herein. The disclosure is not intended to be limited to specific types of dental articles by focusing on the details of dental tray aligners and palatal expanders.

In some examples, the described dental articles include at least one segment defining a complex three-dimensional shape configured to follow contours or geometry of an oral anatomy of a patient including, for example, the contours of one or more teeth. The segment includes a core component composed mostly of parylene (e.g., a majority or more than 50% parylene) or consisting essentially of parylene. As discussed further below, parylene has been found to possess several beneficial properties in the production of dental articles including, for example, sufficient mechanical properties even after a prolonged exposure to aqueous environments, optical or aesthetic properties (e.g., clarity), biocompatibility, anti-staining properties, anti-microbial properties, and the like. The described manufacturing techniques to produce the dental articles described herein may likewise produce a core component having reduced or substantially no impurities. The described features may lead to dental articles with greater customization and control during the production of the complex three-dimensional shapes used in dental articles.

In some examples, the core component including parylene may be formed using a chemical vapor deposition (CVD) process. The CVD process may result in the core component having relatively high density (relatively low porosity) and a high degree of thickness uniformity of parylene compared to other polymer formation processes. For example, the CVD-deposited parylene material may be deposited on a model that defines a complex three-dimensional geometry, which mimics the contours of the oral anatomy of the patient. The parylene material is deposited on a molecule by molecule basis uniformly over the complex shape of the model which may result in the core component defining a complex geometric shape that substantially conforms to a geometry of the underlying model and possesses a substantially uniform (e.g., uniform or nearly uniform) thickness. In comparison, dip coating, spray coating, or thermoforming polymers over such complex three-dimensional shapes may result in "necking" or thinning of the polymeric materials along steep sides of the model, pooling, or other manufacturing complications that result in a non-uniform thickness of the resultant polymeric material. Such aspects can lead to a reduction in a magnitude of force application or control of force application of the dental article in the thinned regions, improper fit in regions where the material has pooled or built up, early fatigue of the dental article, or combinations thereof. The CVD-deposited parylene material may address one or more of these manufacturing drawbacks.

In some examples, substantially uniform thickness of the deposited parylene material may facilitate the production of a dental article, in particular the segment including the core component, that can be positioned directly over and in close geometric conformity with one or more teeth of a patient. Such conformity may be important for dental devices such as dental tray aligners, night guards, dental attachments, retainers, mouth guards, palatal expanders, or the like, where precision fit may be important to achieve desired results using the dental article.

Figure 2:
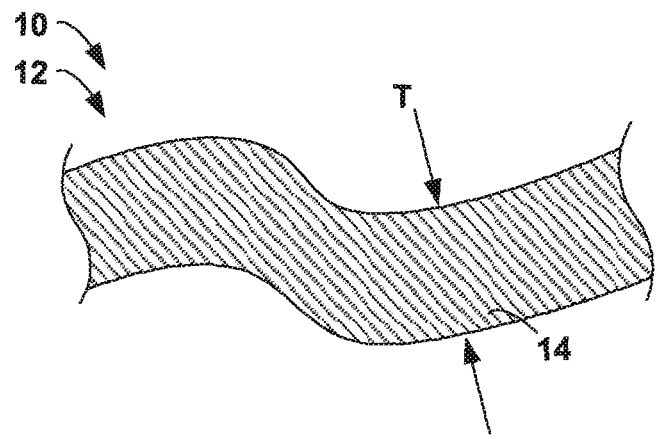
FIG. 2 is a schematic cross-sectional view of the segment of the dental article of FIG. 1.

FIG. 1 is a perspective view of an example dental article 10 with a segment 12 of dental article 10 including a core component 14 including mostly (e.g., more than 50%) of parylene. FIG. 2 is a schematic cross-sectional view of segment 12 of dental article 10 of FIG. 1.

Segment 12 of dental article 10 may define a complex three-dimensional shape configured to follow contours of the oral anatomy of a patient. For example, segment 12 may follow the contours of a patient's tooth or teeth, gums, hard or soft pallet, portions of the oral cavity under the tongue, or combinations thereof. In the example of FIG. 1, dental article 10 is illustrated as a dental tray aligner configured to follow the complex contours of a patient's dental architecture with segment 12 representing at least a portion of dental article 10 covering one or more teeth. In some examples, segment 12 may be shaped to follow the contours of at least one or more teeth of a patient allowing segment 12 to be placed over and in intimate contact with the tooth or teeth. In some examples, segment 12 may include the entire dental article 10 while in other examples, such as those described further below, segment 12 may include only a portion of dental article 10 such as, for example, a portion of the dental article configured to be positioned over or in contact with the tooth or teeth of a patient. In some examples, dental article 10 may include a plurality of segments 12, with each segment 12 including a respective core component 14 and the different segments 12 being connected by one or more dental components (e.g., a spring, a wire, a jumper, a force-conducting mechanism, a polymer, or the like).

In some examples, dental article 10 and segment 12 do not need to mimic the exact contours or an oral anatomy of the patient. For example, in a dental tray aligner, dental article 10, segment 12, or both may be sized and shaped to be slightly different than the exact shape and contour of the oral anatomy of the patient for dental article 10 to exert a corrective force on the teeth of the patient to urge the dental arrangement toward a new desired configuration. To cause the teeth to move, the therapeutic force generally must be above a threshold value. This threshold may be somewhat generalized to suit a population of typical patients, or it may be tailored to the individual patient as a function of several factors, including systolic blood pressure, bone density, immune system health, use of anti-inflammatory drugs, and the like. Absent the threshold or therapeutic force, the teeth will maintain their original positions or at least partially return to their previous positions once the dental tray aligner is removed.

In some examples, segment 12 or other portions of dental article 10 may have a modulus of elasticity of greater than about 100 MPa, such as between about 300 MPa and about 5 GPa in order for dental article 10 to exhibit a sufficient stiffness to apply the corrective force to the teeth of a patient while still being compliant enough to be forced onto the teeth of the patient and relatively thin for patient acceptance. In the example of a dental tray aligner, the flexibility of segment 12 may permit dental article 10 to be advanced over the contours of the teeth of a patient to allow for insertion and/or removal of dental article 10 when desired. In some examples, by formulating segment 12 to possess and maintain a modulus of elasticity greater than about 300 MPa, even after exposure to liquids such as water in the patient's oral cavity, dental article 10 can apply the desired therapeutic force to the teeth even when the thickness of such an article remains relatively thin (e.g., on the order of about 100 micrometers ($\mu$m) to about 1000 $\mu$m). Additionally, or alternatively, by formulating segment 12 to define a modulus of elasticity less than about 5 GPa, segment 12 may still remain somewhat flexible to permit dental device 10 to have some degree of flexibility where needed. The modulus of elasticity of a material may be measured according to ASTM D638.

Segment 12 of dental article 10 includes a core component 14 that includes mostly parylene (i.e., more than 50% parylene). As used herein, "core component" is used to refer to the central and primary component of segment 12. Core component 14 may be a structural component of segment 12, e.g., may be a primary load-bearing or force-transmitting portion of segment 12, as opposed to a thin coating of material on another structural component. In some examples, segment 12 may include only core component 14, while in other examples, segment 12 may include core component 14 and one or more coating layers applied thereto. In some examples, segment 12 may define a material thickness (T in FIG. 2) as measured perpendicular from a surface of segment 12 intended to set in contact with the teeth of a patient, in which core component 14 accounts for more than about 80% of the total thickness of segment 12, more than about 90% of the total thickness of segment 12, or more than about 95% of the total thickness of segment 12.

Core component 14 may include a majority of parylene. For example, core component 14 may include at least 50% parylene, at least 90% parylene, at least 95% parylene, at least 99% parylene, or may consist essentially of parylene (i.e., consist of parylene apart from any impurities that may be present). As described further below, in some examples, the parylene material used to form core component 14 may be formed as part of a CVD process using a para-xylylene gas that undergoes polymerization to build up a layer of parylene that ultimately forms core component 14. Core component 14 may include any suitable type of parylene including, for example, but not limited to, Parylene-C (polychloro-p-xylylene), Parylene-D (polydichloro-p-xylylene), Parylene-F (polytetrafluoro-p-xylylene), Parylene-N (poly-p-xylylene), Parylene HT® available from Specialty Coating Systems, Indianapolis, Ind. (replaces the alpha hydrogen atom of the N dimer with fluorine), SCS microRESIST® Antimicrobial Parylene Technology available from Specialty Coating Systems, Parylene C-UVF® available from Specialty Coating Systems, or combinations thereof.

In some examples, the parylene may be deposited using a self-initiated chemical vapor deposition (CVD) process with a para-xylylene dimer (e.g., [2.2]paracyclophane for the production of Parylene-C) as the starting component. For example, a build surface such as a three-dimensional model of the oral anatomy of the patient may be positioned in a vacuum deposition chamber that is evacuated to a pressure on the order of about 0.1 torr (about 13.33 Pascal) resulting in a mean free path for gas molecules in the deposition chamber on the order of 0.1 cm. Solid or gaseous para-xylylene dimer may be heated to a temperature that causes the para-xylylene dimer to decompose into a monomeric para-xylylene gas. The monomeric gas may be introduced to the vacuum deposition chamber containing the build surface. The monomeric gas then may be deposited on the build surface where it polymerizes to form a layer of parylene. As the mean free path of the gaseous para-xylylene monomers is on the order of 0.1 cm, the deposition process may be a non-line of sight process, and parylene may be deposited on all or nearly all surfaces of the build surface. Thus, in some examples, parylene may completely coat the desired build surface and the coating may be trimmed into core component 14.

As there are no side molecules formed in the decomposition process of the para-xylylene dimer, the resultant monomeric para-xylylene gas will be substantially pure which may result in core component 14 consisting essentially of pure parylene with substantially no impurities or residual monomeric material being present. Furthermore, as the formation of parylene is initiated via thermal degradation and is self-propagating, the use of solvents, radical initiators, inhibitors, catalysts, or other foreign substances that are typically found in other polymerization processes are essentially eliminated from the process and from the resultant core component 14. As a result, core component 14 may include high purity parylene that may be essentially free (e.g., free or nearly free) of residual components such solvents, radical initiators, catalysts, inhibitors, and the like that may be typically found in other polymeric materials and which may have undesired effects in dental article 10. In some examples, the CVD-deposited parylene may result in a layer comprising greater than 93 wt. % parylene depending on the purity of the initial parylene material used. In some examples, the CVD-deposited parylene may result in a layer comprising greater than 95 wt. % parylene, greater than 99 wt. % parylene. In some examples, the deposited parylene layer may include the same or greater purity parylene than that of the initial monomers used to fabricate the parylene layer. Parylene also has excellent biocompatibility.

In some examples, because parylene is deposited via gas deposition as opposed to a spray, dip, or thermoformed deposition process, the parylene does not pool, bridge, thin, or exhibit meniscus properties and defects that might occur during such deposition processes. As a result, the parylene may be applied to the build surface (e.g., a mandrel, a mold plug, or a positive model) as a relatively thin and substantially uniform-thickness layer of material. For example, the thickness and thickness uniformity of liquid-based coatings may be related to the viscosity, working temperature and humidity, and application process (e.g., spray or dip coating). In some examples, coatings applied using a liquid-based coating technique may have a thickness that varies by as much as +/−50% of the target final thickness of the liquid coating. This lack of uniformity can be exacerbated when coating complex geometries such as three-dimensional models of the teeth of a patient, which contain many areas of high and complex curvature or steep side walls. In contrast, the thickness of the layer including parylene deposited using the CVD process may be a function of the amount of vaporized dimer and the chamber dwell time. In some examples, the thickness of the layer including parylene can be controlled to a tolerance of about +/−5% of a targeted thickness.

The improved tolerance associated with the thickness of core component 14 may be useful for certain orthodontic applications, such as dental tray aligners, where the dental tray aligner is designed to move teeth of a patient by only fractions of a millimeter at a time. In contrast, liquid or thermoformed based coatings may produce non-uniform thicknesses and high spots in the coating which may lead to pinch points or unintended pressure points on the teeth of a patient leading to misalignment or increased discomfort. In some examples, the non-uniform thicknesses and high spots may deviate from an intended thickness or shape by more than the target movement of a tooth, reducing control of tooth movement. The uniformity of core component 14 and, as a result, segment 12, may improve the wearability, accuracy, and effectiveness of dental article 10.

In some examples, the final thickness of core component 14 comprising of substantially parylene may be at least about 50 µm, at least about 100 µm, at least about 250 µm, at least about 500 µm, at least about 1 mm, or at least about 2 mm. In some examples, the final thickness of core component 14 may be less than about 2 mm, less than about 1 mm, less than about 500 µm, less than about 250 µm, less than about 100 µm, or less than about 50 µm. However, in other examples, the thickness of core component 14 may be greater than about 2 mm, such as, up to about 5 mm. In some examples, the thickness of core component 14 may be greater than about 25 µm and less than about 200 µm. Having the layer of parylene be greater than at least about 25 µm may help reduce the aliasing effects described herein in examples in which the build surface includes ridges (e.g., as may result when the build surface is formed using additive manufacturing).

In some examples, due to the small size of the paraxylylene molecule and the CVD process, parylene may be deposited as a relatively dense and water-resistant layer of material, particularly in comparison to other polymeric materials deposited using conventional formation techniques such as thermoforming. For example, conventional polymeric materials used in dental articles may experience softening or degradation of mechanical properties (e.g., hygroscopic swelling or stress relaxation), such as a reduction in the modulus of elasticity of the polymer, in the presence of water over time. This reduction may be attributed to the reduction of or elimination of hydrogen bonding within the polymer due to the exposure to water, which may reduce the modulus of elasticity of the polymeric material. The reduction causes such polymers to soften, which may make the polymers less suitable for certain types of devices including, for example, dental tray aligners used to apply or maintain a force against one or more teeth of a patient. The water-resistant properties of parylene may act as a barrier to water, reducing or substantially preventing the ingress of water into core component 14, thereby allowing core component 14 to substantially retain its mechanical properties in the presence of water. Further, core component 14 that is composed substantially of parylene may define a porosity of less than about 5% by volume and exhibit low hygroscopic swelling. Porosity is defined as a volume of pores divided by a total volume of core component 14, and may be measured using optical microscopy, mercury porosimetry, or the like.

Figure 3:
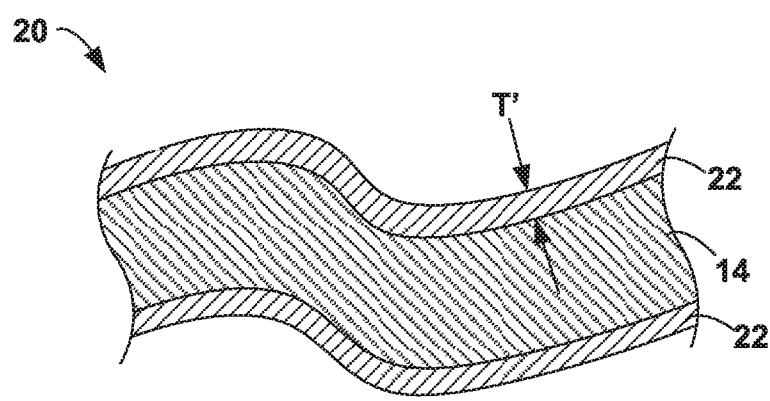
FIG. 3 is a schematic cross-sectional view of another example segment that may be used to form part of the dental article of FIG. 1.

In some examples, segment 12 may include one or more coating layers applied to core component 14. FIG. 3 is a schematic cross-sectional view of another example segment 20 that may be used to form part of dental article 10 of FIG. 1. Segment 20 includes core component 14 including mostly parylene with one or more coating layer 22 on core component 14. Core component 14 of FIG. 3 may be substantially the same as core component 14 described above with respect to FIGS. 1 and 2 apart from any differences described herein.

Coating layer 22 may be used to affect one or more the optical, wear, stain, anti-microbial, water-resistance, durability, tactile, or other properties of core component 14 and segment 20. In some examples, the one or more layers of coating layer 22 may include, for example, one or more layers including an inorganic material, one or more layers including a polymeric hardcoat, or combinations thereof.

In some examples, coating layers 22 may include one or more layers that include an inorganic material, such as a metal, a metal alloy, a metal oxide, a ceramic, a glass, a crystalline mineral, or combinations thereof, that affects the durability and/or wear resistant properties of core component 14. For example, while core component 14 may provide sufficient water resistant and elasticity properties, parylene may possess relatively low wear resistance compared to some inorganic materials. In some such examples, a layer of pure parylene may become worn away by repeated contact with or rubbing against other objects, such as teeth, food, or the like. While lower wear properties may be acceptable for certain dental applications (e.g., removable dental tray aligners, dental retainers, and the like), such wear properties may be less acceptable for applications where dental article 10 is fixed or relatively permanent within the mouth of a patient. Such dental applications may include dental crowns, bridges, dentures, bite splints, orthodontic brackets, continuous wear dental aligners or palatal expanders, or the like where segment 20 remains in the mouth of the patient and undergoes repeated contact (e.g., chewing, grinding) with teeth, food, or the like. In such applications, segment 20 may include one or more coating layers 22 of an inorganic material applied to core component 14 to contribute to the durability and wear resistance of core component 14. Additionally, or alternatively, coating layers 22 may include inorganic materials (e.g., metal oxides) that may provide additional barrier properties (e.g., water and/or antimicrobial barrier properties) to article 20.

Example inorganic materials that may be used as one or more coating layer 22 include, for example, a metal (e.g., biocompatible metals such as gold, silver, aluminum, copper, indium, or titanium); a metal alloy; a metal oxide, a glass, or a ceramic (e.g., silica, alumina, or zirconia); diamond-like-carbon; a metal salt; or the like. Metal salts, such as chlorides, fluorides, sulfates, and carbonates, may be formed through exposure of a metal to acids or gases containing these ions. In some cases, the application of a positive electric charge to the metal layer may be beneficial to attracting the negative ions needed to form a salt. In some examples, one or more coating layer 22 may include multiple layers with different inorganic materials in the different layers.

In some examples, one or more coating layer 22 may include a layer including an elemental metal and an oxide layer formed through exposure of the elemental metal to the atmosphere or an oxygen-rich gaseous environment. Any suitable biocompatible metal oxide may be included in one or more coating layer 22 including, for example, at least one of silver oxide, zinc oxide, copper oxide, titanium oxide, aluminum oxide, and mixtures and alloys thereof such as an oxide of silver copper zinc alloy (e.g., AgCuZnOx), Ag-doped zinc oxide, Ag-doped aluminum oxide, Ag-doped titanium oxide, and Al-doped zinc oxide. In some examples, in addition to a metal oxide, one or more coating layer 22 may optionally include additional metal compounds such as silver chloride, silver bromide, silver iodide, silver fluoride, copper halide, zinc halide, and combinations thereof. Additional examples regarding the properties of layers incorporating metal oxides are described in U.S. Provisional Patent Application Ser. No. 62/685,773, which is incorporated by reference in its entirety.

In some examples, metal oxides can be used to provide anti-microbial or antibacterial properties of dental article 10. For example, one or more coating layer 22 may include one or more metal oxides that define the outermost layer of one or more coating layer 22 to provide at least one of anti-microbial, antibacterial, or anti-biofilm properties over an extended time period to reduce or substantially prevent at least one of undesirable results of microbial contamination such as, for example, unwanted odor, flavor, or discoloration, which can be induced by microbial contamination of the surface, or by a biofilm formed on the surface of dental article 10. In some examples, the antimicrobial effect may occur when dental article 10 is brought into contact with an alcohol or a water-based electrolyte such as a body fluid or body tissue in the mouth of the patient, thus releasing metal ions such as, for example, Ag+, Al+, atoms, molecules, clusters, or the like. The concentration of the metal which is needed to produce an anti-microbial effect will vary from metal to metal in the metal oxide. In some examples, the described anti-microbial effect may be achieved in body fluids such as saliva at concentrations of less than about 10 ppm. In some examples, the metal oxide within an outermost layer of one or more coating layer 22 may exhibit at least a 2-log microbial reduction against *S. aureus* and *S. mutans* following 24-hour contact. Log reductions may be measured after testing according to ISO test method ISO 22196:2011, "Measurement of antibacterial activity on plastics and other non-porous surfaces," with appropriate modifications of the test method to accommodate the test materials. Additionally, or alternatively, the metal oxides may prevent calculus build-up on dental article 10 or can include additives to prevent the formation of cavities in the teeth of the patient.

Additionally, or alternatively, one or more coating layer 22 may include a polymeric hardcoat. As used herein a "polymeric hardcoat" may be used to describe a polymer-based coating layer that has a higher abrasive wear resistance than a layer of parylene of the same thickness. In some examples, the abrasive wear resistance properties may be measured by rubbing a tooth surrogate against the surface of a layer of the respective coating material and assessing the damage to the layer after a simulated two weeks of wear. A layer that includes a polymeric hardcoat may improve the durability and wear resistant properties of core component 14. Additionally, or alternatively, the polymeric hardcoat may improve the abrasion resistance of core component 14.

Example materials suitable as a polymeric hardcoat may include, for example, cross linkable matrix monomers, oligomers, or polymers with one or more functionalized inorganic fillers. The inorganic fillers may help improve the abrasion resistance of the resultant layer. In some examples, the polymeric hardcoats may be prepared as single component mixtures, multi-component curable formulations, dispersions, and the like. Preferred polymeric hardcoats may be relatively transparent/translucent, smooth, provide strong adherence to core component 14, be somewhat flexible to minimize cracking during use, stain resistant, have an abrasion resistance greater than parylene, or a combination thereof. Example polymeric hardcoats may include 3M 906 Abrasion Resistant Hardcoat available from 3M Corporation, St. Paul, Minn., USA or the hardcoats described in U.S. patent application Ser. No. 14/404,970, which is incorporated by reference in its entirety.

In some examples, one or more coating layer 22 may optionally include a dye or pigment to provide a desired color that may be, for example, decorative or selected to modify the appearance of the teeth of the patient when the patient is wearing dental article 10. The dye or pigment may be added in addition to the inorganic materials or polymeric hardcoats described above. Additionally, or alternatively, core component 14 may be configured to exhibit certain optical properties. For example, core component 14 may include Parylene C-UVF®, which includes Parylene-C and a special compound designed to fluoresce under black light.

One or more coating layer 22 may be deposited on core component 14 using any suitable technique including, for example, chemical vapor deposition, plasma chemical vapor deposition, evaporative deposition, sputtering, atomic layer deposition, electroless plating (e.g., chemical or auto-catalytic plating), electroplating (e.g., after a first conductive layer has been deposited on core component 14), spray coating, dip coating, or the like. In some examples, one or more coating layer 22 may define a total thickness (T in FIG. 3) from the surface of core component 14 of about 0.1 µm and about 5 µm.

Figure 4:
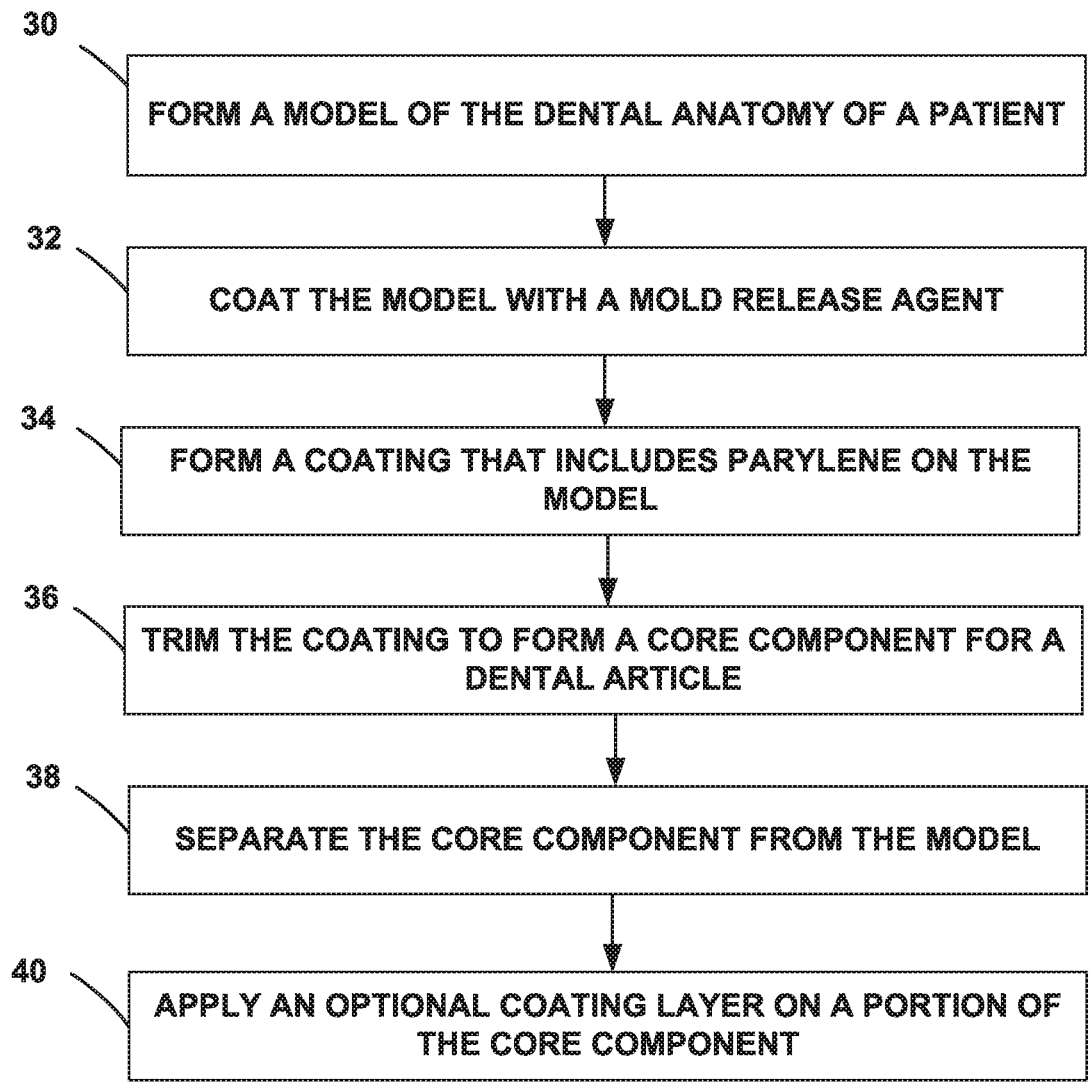
FIG. 4 is a flow diagram illustrating an example technique for forming the core component and segment of FIGS. 1-3.

FIG. 4 is a flow diagram illustrating an example technique for forming core component 14 and segment 12 and 20 of FIGS. 1-3. The technique of FIG. 4 is described with reference to the various aspects of dental article 10 for illustrative purposes. However, such descriptions are not intended to be limiting, and the techniques of FIG. 4 may be used with other dental articles and core component 14 and segments 12 and 20 may be formed using other techniques than those described in FIG. 4. FIG. 4 is described with respect to the article and layers shown in FIGS. 5A-5E for clarity. FIGS. 5A-5E are schematic cross-sectional views of an example layer build process for forming core component 14.

The technique of FIG. 4 includes forming a three-dimensional model 50 of an oral anatomy of a patient (30); coating model 50 with a release agent 52 (32); forming a coating 54 that includes parylene on model 50 (34); optionally trimming coating 54 to form core component 14 for dental article 10 (36); separating core component 14 from model 50 (38); and applying one or more optional coating layers 22 on a portion of core component 14 (40). As described above, core component 14 may form part of dental article 10, which may include a dental tray aligner, a dental crown, a night guard, a retainer, a palatal expander, an implant, a denture, a partial, a temporary replacement, a spring aligner, a dental attachment, a dental article including a polymeric archwire, an arch member, a custom force member, a spring, a bracket, or other bonded appliances, trays for delivering a therapeutic agent, or the like, which include at least one segment 12 or 20 that includes core component 14.

Figure 5A:
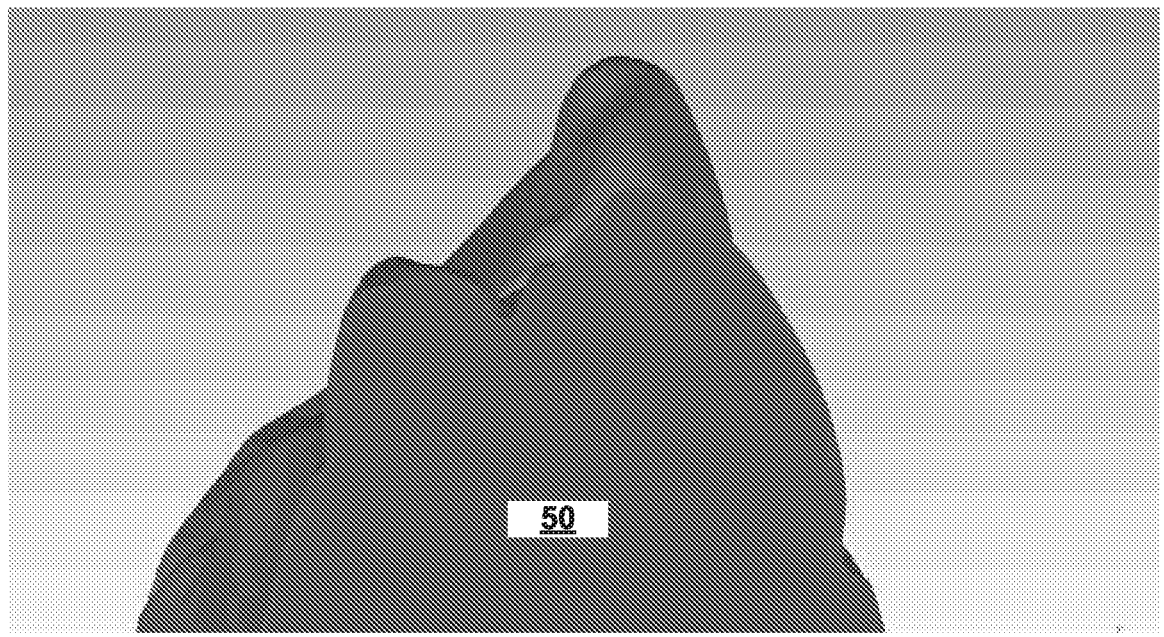
FIGS. 5A-5E are schematic cross-sectional views of an example layer build process for forming the core component of FIG. 1.
Figure 5B:
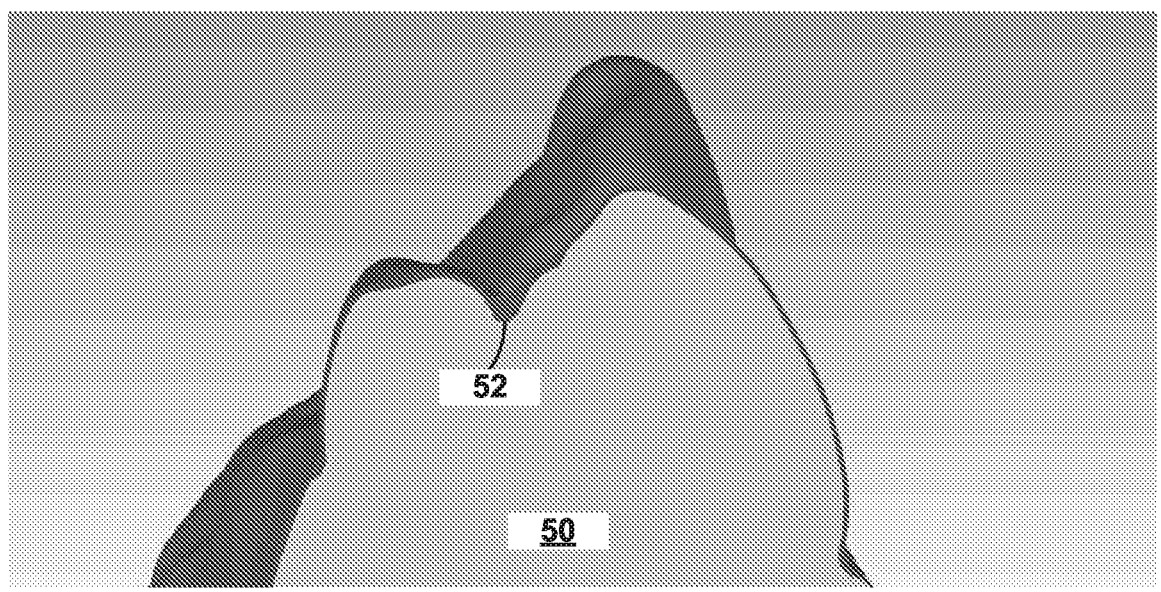

The technique of FIG. 4 includes forming three-dimensional model 50 of the oral anatomy of a patient (30) using any suitable technique, and optionally coating model 50 with release agent 52 such as polyvinyl alcohol (32). FIG. 5A shows dental model 50 once formed and FIG. 5B shows dental model 50 coated with release agent 52. In some examples, model 50 may be formed by pouring a casting of an impression of the oral anatomy of a patient. In other examples, dental model 50 may be formed using three-dimensional printing or additive manufacturing. For example, as described further below a digital three-dimensional representation of the teeth and at least a portion of the gingiva of a patient may be produced using, for example, an intraoral scanner. Dental model 50 may be directly produced based on the digital representation of the teeth using a three-dimensional printer.

While model 50 is generally illustrated and described as being a positive rendition of a patient's oral anatomy, in some example, model 50 may be a negative mold in which parylene is deposited along the surfaces of cavities within the model 50. The selection between a positive versus negative space model 50 may depend on the type of dental appliance being formed.

In some examples, dental model 50 may be milled or polished once formed and release agent 52 may be applied to the surface of model 50 to help prevent the subsequently applied parylene from fixedly adhering to model 50. Release agent 52 may not form part of dental article 10.

As described above, dental model 50 may define a complex, three-dimensional shape that mimics the contours of the oral anatomy of the patient. In some examples, dental model 50 may not be configured as an exact replica of the oral anatomy of the patient, rather model 50 may represent the desired dental alignment or an intermediary stage toward the desired dental alignment.

Figure 5C:
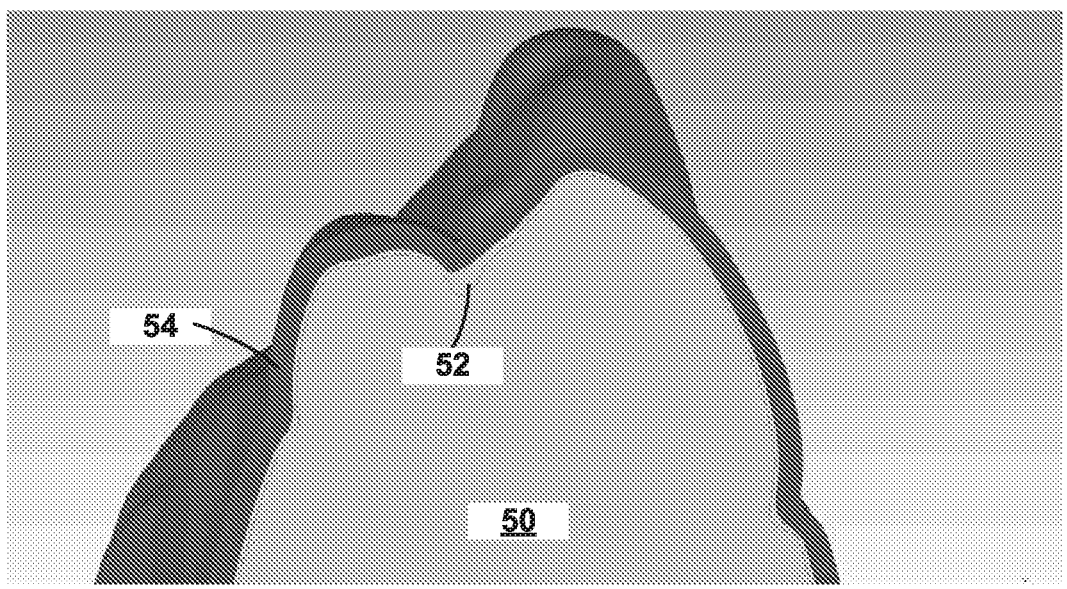

Next, a coating layer 54 including parylene may be applied (e.g., using CVD) to the model 50 (34) using the techniques described herein. FIG. 5C shows dental model 50 with coating 54 applied over model 50 and mold release agent 52. Coating 54 may be deposited on model 50 until a desired thickness is reached. Coating 54 may include one or more layers composed of parylene. Parylene may be deposited to any suitable layer thickness including, for example, a thickness of at least 50 μm, at least 100 μm, at least 250 μm, at least 500 μm, at least 1 mm, or at least 2 mm. Various modifications to the parylene may be done, for instance by using halogenated monomers and/or incorporating additives to provide additional properties, such as microRESIST Antimicrobial Parylene Technology from SCS Coatings (Clear Lake, Wis.). In some examples, coating 54 may include one or more layers of Parylene-C, Parylene-D, Parylene-F, Parylene HT, SCS microRESIST®, Parylene-N, Parylene C-UVF®, or combinations thereof. In some examples, coating 54 may include at least one layer of Parylene-C.

In examples in which dental model 50 is three-dimensionally printed, the layer-by-layer printing process may produce a textured surface marked by contour lines or "stair steps" (also known as aliasing effects). If the aliasing effects were transferred to the outer surface of dental article 10 (e.g., the surface of the article in contact with the patient's lips or tongue), the article may have a roughened or otherwise unpleasant texture or feel, or possess diminished optical appearance due to light scattering off the contour lines. Other undesirable effects stemming from aliasing or surface roughness may include biofilm formation and increased friction or interference with opposing surfaces in the dentition. Oral biofilms including bacteria cultures can lead to acid production, odors, and calculus build-up. The inside corners created at the boundaries of material layers during the manufacturing process can serve as refuges for bacteria cultures, protecting them from salivary flows and wiping action by the tongue and oral mucosa.

In some examples, the application of release agent 52 and the deposition of parylene via chemical vapor deposition to form coating 54 may reduce the transfer of the aliasing effect to core component 14 and may improve the visual or tactile properties of dental article 10. For example, parylene may be applied using CVD wherein the parylene is created directly on the surface of release agent 52 from individual monomer molecules. These molecules are supplied in gaseous form and condense into polymers on the surface of the substrate, thereby allowing them to deposit in the smallest of microscopic textures. As more and more molecules integrate with the surface, the coating grows thicker, eventually filling and smoothing over these microscopic textures. As a result, the application of release agent 52 and gradual growth of coating 54 on model 50 may reduce a roughness along the exterior surface of coating 54 by smoothing aliasing effects or general surface textures resulting from the printing process. By smoothing the exterior surface of core component 14, dental article 10 may possess an improved sensory feel in the mouth of a patient. Additionally, because parylene is deposited as a clear coating, smoothing the outer surface of core component 14 may improve the clarity of the resultant dental article 10 and overall visual aesthetics. Additionally, due to the vapor deposition process used to form coating 54, the parylene itself may generate a glossier finish with a reduced surface roughness compared to other polymeric materials. The reduced surface roughness attributed to parylene, may also inhibit biofilm formation compared to other polymeric materials, which can occur over the surface of the appliance if it is not polished to a high gloss or protected with a glossy finish.

Additionally, or alternatively, CVD application of coating 54 may offer several benefits over conventional pressure molding with thermoplastic materials. For example, with conventional pressure molding, a sheet of thermoplastic material is heated to a flowable plastic state, where the sheet is then pressure formed over a three-dimensional model. Because the thermoplastic makes direct contact with the model, much heat is transferred to the model in the time needed for the sheet to conform to the model, cool, and solidify into its final shape. Upon heating, the model may expand non-uniformly due to temperature gradients across the surface of the model. Depending on the material used to construct the model, the glass transition temperature of the model may be approached, leading to softening of the model material. Subsequent pressure forming over such a model, which may involve a pressure gradient across the thermoplastic sheet of about 45 PSI (e.g., about 3.1 bar), may result in permanent distortion of the model which will be replicated and preserved in the shape of the thermoplastic material. Because CVD application of parylene does not involve any of the pressure gradients described above, such distortions of model 50 are not observed during the formation of coating 54.

In some examples, pressure molded thermoplastics may also exhibit a residual stress preserved in the material that urges the material back towards its pre-formed shape. In some examples, the molded thermoplastic materials may relax toward this previous shape as a result of subsequent heating, such as by the heating associated with inserting the article into the mouth of a patient. Because the CVD of parylene does not involve any prefabricated forms of the coating 54, coating 54 will not exhibit the residual stresses described above.

Figure 5D:
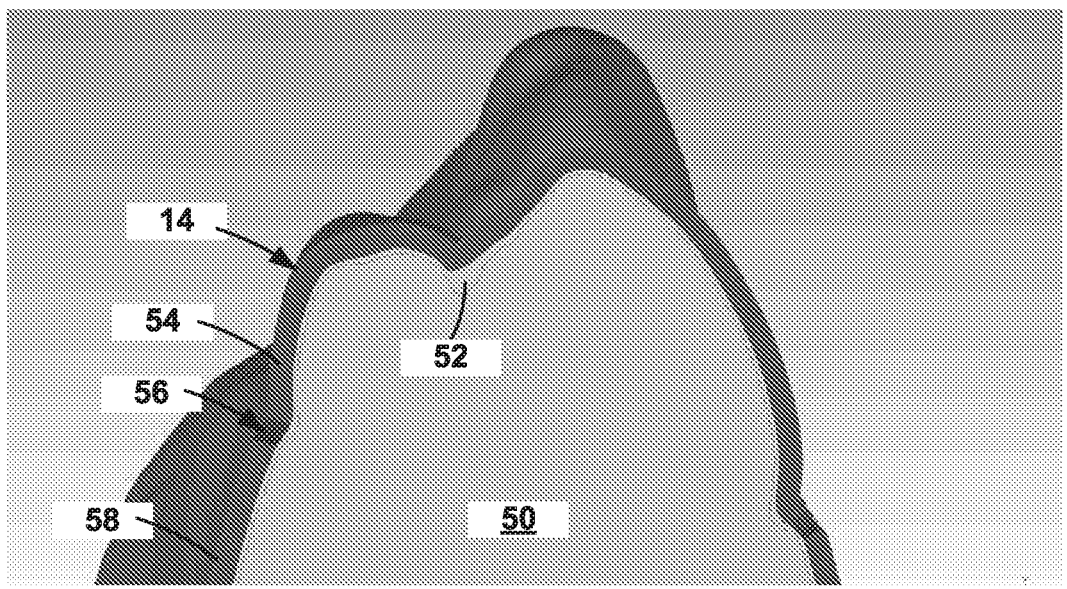
Figure 5E:
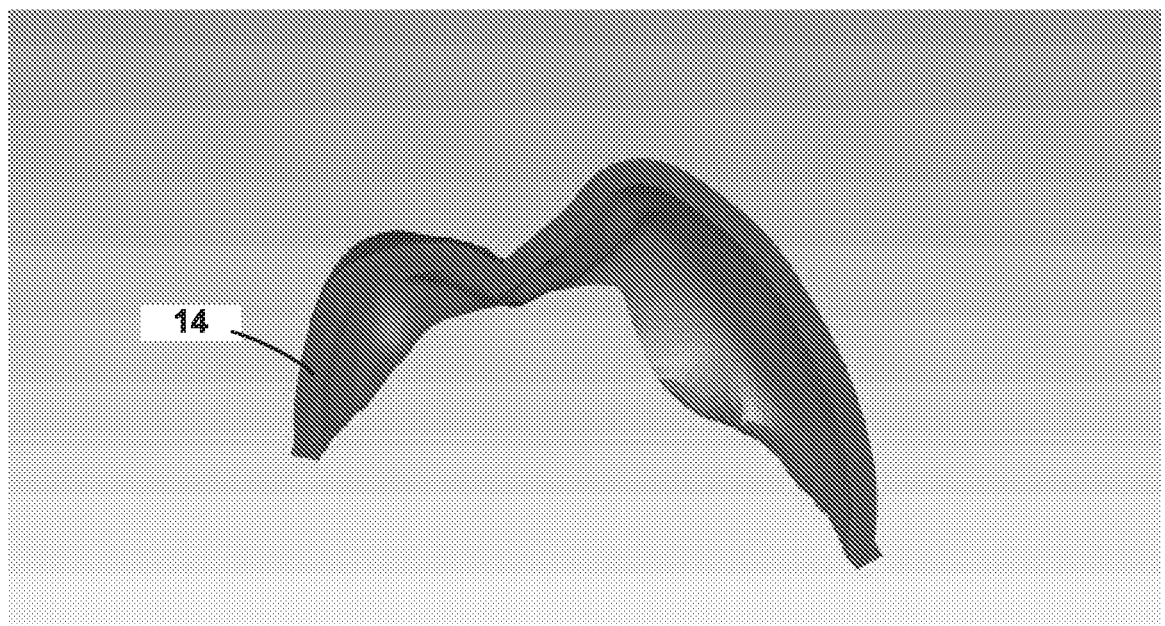

After coating 54 has been formed and built up to a desired thickness, coating 54 may be trimmed (36) along trim line 56 using, for example, a CNC 5-axis milling or laser cutting tool to the appropriate size to form core component 14. Any excess material 58 may be optionally removed. FIG. 5D shows coating 54 trimmed to the desired size. At this point in the production, core component 14 will be formed (e.g., trimmed coating 54) composed mostly of parylene. Core component 14 may then be separated from model 50 (58), for example, by soaking the article and model in warm water to dissolve release agent 52 if present. FIG. 5E illustrates the completed core component 14 released from model 50.

In some examples, core component 14 may be coated with one or more optional coating layers 22 (40). For example, the technique of FIG. 4 may include coating core component 14 with one or more layers of an inorganic material, one or more layers of a polymeric hardcoat, or combinations thereof. The one or more coating layers 22 may be applied to core component 14 prior to trimming coating 54, prior to separating core component 14 from model 50, after separating core component 14 from model 50, or combinations thereof depending on the intended function and desired location of a respective coating layer 22. In some examples, one or more coating layers 22 may be deposited on the outer surface of core component 14 (e.g., surfaces of core component not intended to be positioned in contact with the teeth of the patient). For example, coating layers 22 intended to improve the tactile feel or optical properties of dental article 10 may be deposited on the outer surface of core component 14 by, for example, depositing the respective coating prior to removing core component 14 from model 50. Additionally, or alternatively coating layers 22 intended to improve antimicrobial properties of dental article 10 may be deposited on the inner surface of core component 14 (e.g., surfaces of core component 14 intended to be positioned in contact with the teeth of the patient), the outer surface, or both surfaces by, for example, depositing the respective coating after removing core component 14 from model 50.

Figure 6A:
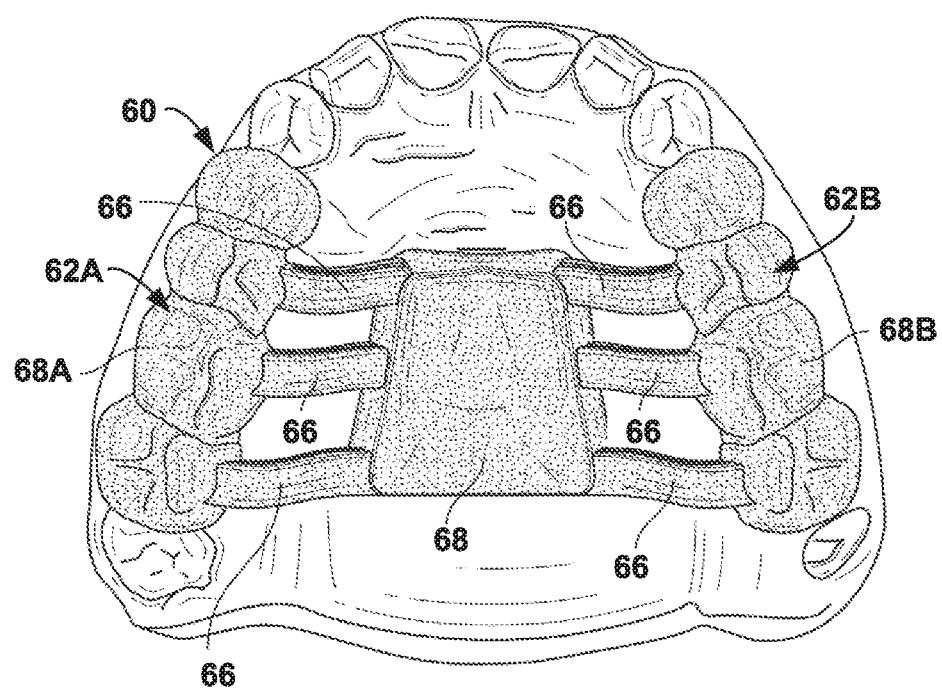
FIGS. 6A and 6B are schematic views of another example dental article that includes additional dental components attached to a segment that includes a core component composed substantially of parylene.
Figure 6B:
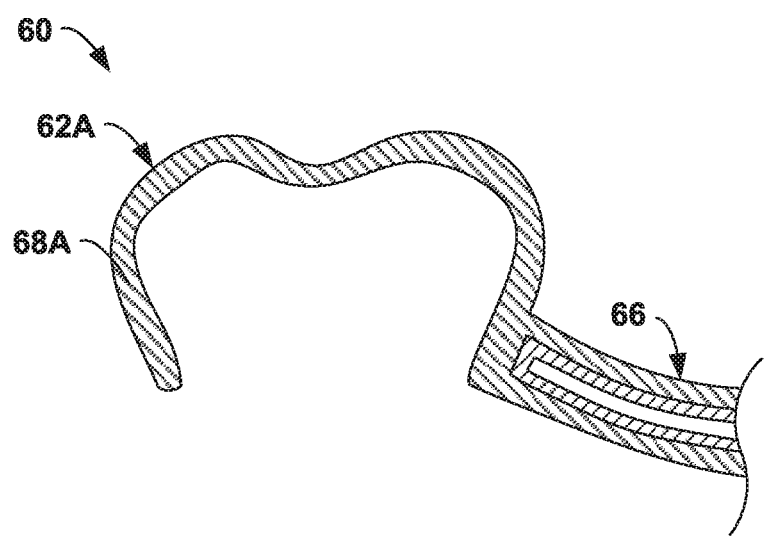

While dental article 10 is primarily described as a simple dental tray aligner, dental article 10 need not be limited to such devices. In other examples, dental article 10 may include other oral devices used in dental procedures including, but not limited to, night guards, retainers, mouthguards, palatal expanders, dental crowns, implants, dentures, partials, temporary replacements, trays for delivering therapeutic agents, or the like. Dental article 10 may also include additional dental components connected to segment 12, 22 that do not include core component 14 and/or include core components comprised of materials other than parylene. For example, dental article 10 may include one or more custom force members, springs, spring aligners, jumpers, archwires, arch members, palate plates, brackets, attachment mechanisms, elastic bands, or the like connected to segment 12 with segment 12 being configured to fit over one or more teeth of the patient. FIGS. 6A and 6B are schematic views of another example dental article that includes additional dental components attached to a segment that includes a core component composed substantially of parylene. The dental article of FIGS. 6A and 6B is in the form of an orthodontic palatal expander 60 that includes a first segment 62A, a second segment 62B, and a plate 66 having one or more beams 64 that extent therefrom and connect to first and second segments 62A and 62B. FIG. 6A is an occlusal view of palatal expander 60 installed on a dental arch of a patient. FIG. 6B is a cross-sectional view of a portion of first segment 62A and part of one of beams 64.

Each of first and second segments 62A and 62B may define a complex three-dimensional geometry that follows the contours of the oral anatomy of the patient and are configured to receive at least one tooth of respective posterior segments of a dental arch. The at least one tooth may include all or less than all posterior teeth of the respective posterior segment. Each of first and second segments 62A and 62B includes a respective core component 68A and 68B composed of substantially parylene. The respective core components 68A and 68B may be substantially similar to core component 14 described above apart from any differences noted below. As described above, core components 68A and 68B of segments 62A and 62B may include one or more optional coating layers 22 applied thereto to enhance one or more of the physical, mechanical, or aesthetic properties of core components 68A and 68B.

First and second segments 62A and 62B may define a wall thickness sufficient to withstand the forces applied by the remaining dental components of palatal expander 60, such as beams 64. For example, the walls of first and second segments 62A and 62B may define a thickness of between about 0.2 mm and about 5 mm, such as between about 0.5 mm and about 3 mm, or between about 0.5 mm and about 2 mm, or about 1 mm. In some examples, occlusal walls of first and second segments 62A and 62B may be thinner than lingual and buccal walls of first and second segments 62A and 62B to allow the patient to close their bite more fully.

Palatal expander 60 also includes additional dental components in the form of beams 64 and plate 66 which may include materials different than that of core components 68A and 68B. Beams 64 and plate 66 are positioned between first and second segments 62A and 62BA and apply an outward force during the palatal expansion treatment. In some examples, each beam 64 may be a split beam design that defines two distinct beam members of relatively high modulus material. The relatively high modulus material may enable beams 64 to store energy in response to deformation and exert forces on first and second segments 62A and 62B. For example, palatal expander 60 may be formed with a shape corresponding to a desired position of first and second posterior segments, and the patient or a provider may deform palatal expander 60 when installing palatal expander 60 on the teeth of the patient. The deformation may be concentrated in beams 64 and may generate the energy released by beams 64 in the form of forces on first and second segments 62A and 62B. The relatively high modulus material from which beams 64 and plate 66 are formed may include, for example, a biocompatible metal such as stainless steel, titanium, a nickel-titanium alloy, or another alloy; a high modulus polymeric material; or the like.

In some examples, the dental components of beams 64 and plate 66 may be formed separate from first and second segments 62A and 62B or may be integrally formed with first and second segments 62A and 62B. For example, beams 64 and plate 66 may be formed using any suitable technique such as additive manufacturing (e.g., three-dimensional printing, thermoforming, molding or sculpting, or the like). Beams 64 and plate 66 may be subsequently attached to first and second segments 62A and 62B.

In some examples, beams 64 and plate 66 may be attached to first and second segments 62A and 62B as part of the CVD process used to form core components 68A and 68B. For example, beams 64 and plate 66 may be incorporated with model 50 in their intended location either prior to the deposition of layer 54 or midway through the parylene deposition process. Once incorporated, the deposition of parylene may be completed such that the parylene at least partially coats beams 64 and/or plate 66 to integrally attach beams 64 and/or plate 66 into the construction of layer 54 and resultant core components 68A and 68B.

In some examples, one or both of beams and plate 66 may also be constructed such that the components include a majority of parylene. For example, a model of the patient's oral anatomy may be initially constructed following the deposition of an initial layer of parylene to partially construct palatal expander 60. Following the formation of the initial parylene layer, portions of the palatal expander 60 may be masked by a temporary masking material. In some examples, the masking material may define desired geometric gap spacings (e.g., the relevant gap spacing for split beams 64) or may cover portions of the palatal expander 60 where additional parylene deposition is not desired. In some examples, the masking material may be a pliable material that is easily deformed to allow for easy removal after the palatal expander 60 or other dental appliance has been completely formed and trimmed to size. Example masking materials may include, for example, silicone rubber or a very low modulus polyurethane. The masking material may be inherently resistant to parylene adhesion, or it may be coated with a suitable mold release agent that allows the masking material to be subsequently separated from parylene during post processing. In other examples, the masking material may be comprised of a material having a relatively low melting point, such as wax or polycaprolactone (PCL), or a soluble material, such as polyvinyl alcohol (PVA). The masking material can then be removed by liquification, either by heating and melting the material or by exposing it to a solvent, such as water or alcohol.

After depositing the masking material as desired, an additional layer of parylene may be applied to the article to complete the parylene formation and integrally combine with the exposed, previously deposited segments of parylene. The resultant palatal expander 60 or other dental article may then be trimmed or cut to the appropriate size or shape and the masking material removed.

In other examples, auxiliary parts such as the beam 64 or plate 66 may be permanently embedded in the parylene, either adjacent to the model and entirely under the parylene coating or embedded between layers of parylene as described above. Selective trimming of the appliance may take place after any or all layers of parylene have been applied to expose portions of the embedded parts.

The above described processes for integrally attaching beams 64 and plate 66 to first and second segments 62A and 62B may also be used to incorporate other orthodontic structures, attachments, or the like into a respective dental device 10 that includes at least one segment 12 comprising core component 14. The respective orthodontic components may be placed relative to model 50 of the oral anatomy of a patient in a desired position and integrally connected to the respective core component 14 through the parylene deposition process. In some such examples, core component 14 may still define a complex three-dimensional shape that mimics the oral anatomy of the patient as defined by model 50.

Figure 7:
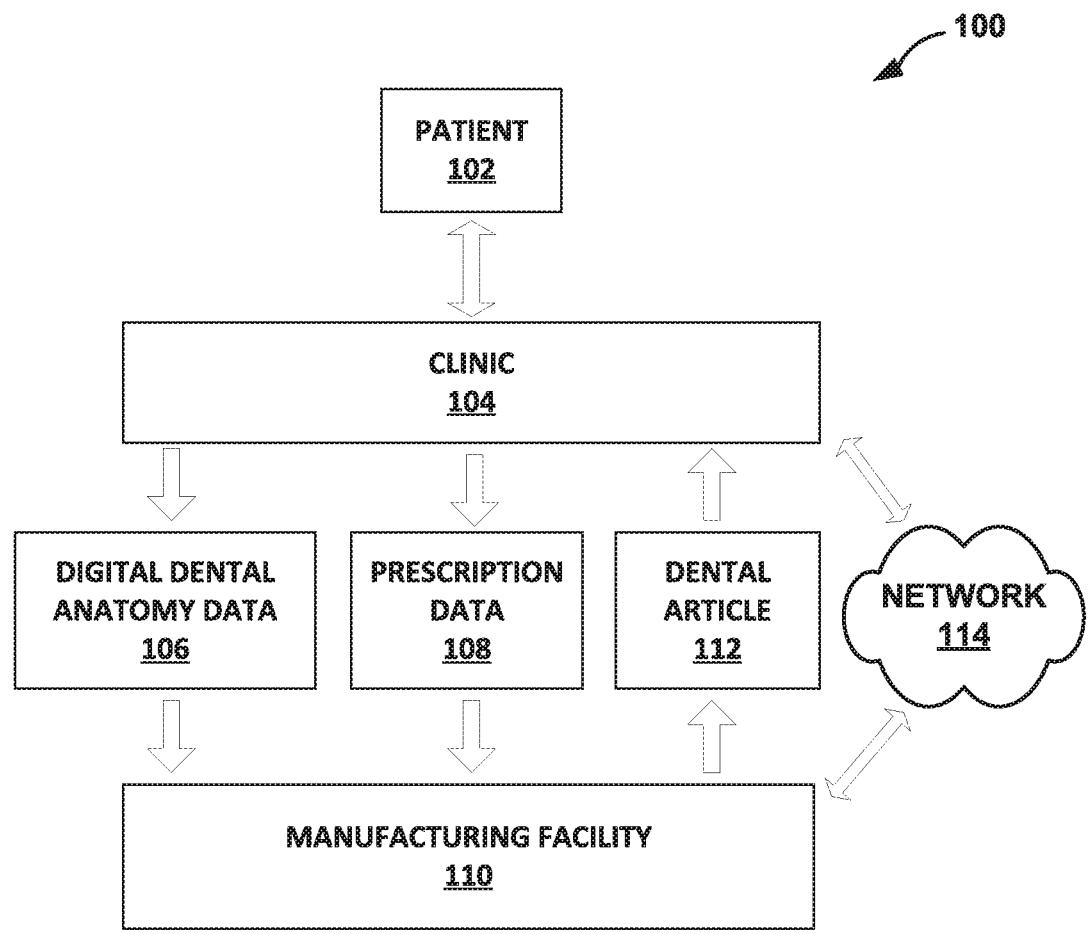
FIG. 7 is a block diagram illustrating an example computer environment in which a clinic and manufacturing facility communicate information throughout a dental appliance manufacturing process.

FIG. 7 is a block diagram illustrating an example computer environment 100 in which clinic 104 and manufacturing facility 110 communicate information throughout a manufacturing process of dental article 112 for a patient 102. Dental article 112 may include any one of dental articles 10, 20, or 60 described above. Initially, an orthodontic practitioner of clinic 104 generates one or more images of a dental anatomy of patient 102 using any suitable imaging technique and generates digital dental anatomy data 106 (e.g., a digital representation of patient's 102 dental anatomy). For example, the practitioner may generate X-RAY images that can be digitally scanned. Alternatively, the practitioner may capture digital images of the patient dental anatomy using, for example, conventional computed tomography (CT), laser scanning, intra-oral scanning, CT scans of dental impressions, scans of dental casts poured from impressions, ultrasound instrumentation, magnetic resonance imaging (MRI), or any other suitable method of three-dimensional (3D) data acquisition. In other embodiments, the digital images may be provided using a hand-held intra-oral scanner such as the intra-oral scanner using active wavefront sampling developed by Brontes Technologies, Inc. (Lexington, Mass.) and described in PCT Publication No. WO 2007/084727 (Boerjes, et al.), which is incorporated by reference herein. Alternatively, other intra-oral scanners or intra-oral contact probes may be used. As another option, the digital dental anatomy data 106 may be provided by scanning a negative impression of patient's 102 teeth. As still another option, the digital dental anatomy data 106 may be provided by imaging a positive physical model of patient's 102 teeth or by using a contact probe on a model of patient's 102 teeth. The model used for scanning may be made, for example, by casting an impression of patient's 102 dentition from a suitable impression material such as alginate or polyvinylsiloxane (PVS), pouring a casting material (such as orthodontic stone or epoxy resin) into the impression, and allowing the casting material to cure. Any suitable scanning technique may be used for scanning the model, including those described above. Other possible scanning methods are described in U.S. Patent Publication No. 2007/0031791 (Cinader et al.), which is incorporated by reference herein.

In addition to providing digital images by scanning the exposed surfaces of the teeth, it is possible to image non-visible features of the dentition, such as the roots of patient's 102 teeth and patient's 102 jaw bones. In some embodiments, the digital dental anatomy data 106 is formed by providing several 3D images of these features and subsequently "stitching" them together. These different images need not be provided using the same imaging technique. For example, a digital image of teeth roots provided with a CT scan may be integrated with a digital image of the teeth crowns provided with an intraoral visible light scanner. Scaling and registering of two-dimensional (2D) dental images with 3D dental images is described in U.S. Pat. No. 6,845,175 (Kopelman, et al.), which is incorporated by reference herein, and U.S. Patent Publication No. 2004/0029068 (Badura et al.), which is also incorporated by reference herein. Issued U.S. Pat. No. 7,027,642 (Imgrund, et al.), which is incorporated by reference herein, and U.S. Pat. No. 7,234,937 (Sachdeva, et al.), which is also incorporated by reference herein, describe using techniques of integrating digital images provided from various 3D sources. Accordingly, the term "imaging" as it is used herein is not limited to normal photographic imaging of visually apparent structures, but includes imaging of dental anatomies that are hidden from view. The dental anatomy may include, but is not limited to, any portion of crowns or roots of one or more teeth of a dental arch, gingiva, periodontal ligaments, alveolar bone, cortical bone, implants, artificial crowns, bridges, veneers, dentures, orthodontic appliances, or any structure that could be considered part of the dentition before, during, or after treatment.

To generate digital dental anatomy data 106, a computer must transform raw data from the imaging systems into usable digital models. For example, for raw data representing the shapes of teeth received by a computer, the raw data is often little more than a point cloud in 3D space. Typically, this point cloud is surfaced to create 3D object models of the patient's dentition, including one or more teeth, gingival tissue, and other surrounding oral structure. For this data to be useful in orthodontic diagnosis and treatment, the computer may "segment" dentition surfaces to produce one or more discrete, movable 3D tooth object models representing individual teeth. The computer may further separate these tooth models from the gingiva into separate objects.

Segmentation allows a user to characterize and manipulate the teeth arrangement as a set of individual objects. Advantageously, the computer may derive diagnostic information such as arch length, bite setting, interstitial spacing between adjacent teeth, and even American Board of Orthodontics (ABO) objective grading from these models. As a further benefit, the digital orthodontic setups may provide flexibility in the manufacturing process. By replacing physical processes with digital processes, the data acquisition step and data manipulation steps can be executed at separate locations without the need to transport stone models or impressions from one location to another. Reducing or eliminating the need for shipping physical objects back and forth can result in significant cost savings to both customers and manufacturers of customized appliances.

After generating digital dental anatomy data 106, clinic 104 may store digital dental anatomy data 106 within a patient record in a database. Clinic 104 may, for example, update a local database having a plurality of patient records. Alternatively, clinic 104 may remotely update a central database (optionally within manufacturing facility 110) via network 114. After digital dental anatomy data 106 is stored, clinic 104 electronically communicates digital dental anatomy data 106 to manufacturing facility 110. Alternatively, manufacturing facility 110 may retrieve digital dental anatomy data 106 from the central database. Alternatively, manufacturing facility 110 may retrieve preexisting digital dental anatomy data 106 from a data source unassociated with clinic 104.

Clinic 104 may also forward prescription data 108 conveying general information regarding a practitioner's diagnosis and treatment plan for patient 102 to manufacturing facility 110. In some examples, prescription data 108 may be more specific. For example, digital dental anatomy data 106 may be a digital representation of the dental anatomy of patient 102. The practitioner of clinic 104 may review the digital representation and indicate at least one of desired movements, spacing, and final positions of individual teeth of patient 102. For example, the desired movements, spacing, or final positions of individual teeth of patient 102 may affect the forces to be applied to the teeth of patient 102 at each stage of treatment by dental article 112. The at least one of desired movements, spacing, or final positions of individual teeth of patient 102 may enable the practitioner, a technician at manufacturing facility 110, and a computer at manufacturing facility 110 to determine at least one of selected dimensions, shapes, and construction for model 50 for dental article 112 to result in the desired movement of the teeth of patient 102. Following review of the digital representation, the digital dental anatomy data 106 may be forwarded to manufacturing facility 110. Manufacturing facility 110 may be located off-site, or located within clinic 104.

For example, each clinic 104 may include its own equipment for manufacturing facility 110 such that a treatment plan and digital design may be performed entirely by a clinical practitioner, or an assistant, in the clinical setting, using software installed locally. The manufacturing may be performed in the clinic, as well, by using a 3D printer (or by other methods of additive manufacturing) and CVD machine. A 3D printer allows manufacturing of intricate features for the physical representation (e.g., model 50) of the dental anatomy of patient 102 and/or portions of dental article 112 through additive printing. The 3D printer may use iterative digital designs of original dental anatomy of patient 102 as well as a desired dental anatomy of patient 102 to produce a complex three-dimensional model 50 of the desired dental anatomy of patient 102. Manufacturing may include post-processing to remove uncured resin and remove support structures, or to assemble various components, which may also be necessary and could also be performed in a clinical setting. Once the model 50 is formed, CVD may be used, such as the process described above with respect to FIG. 9, to produce core component 14 and resultant dental article 112.

Manufacturing facility 110 utilizes digital dental anatomy data 106 of patient 102 to construct dental article 112 to reposition teeth of patient 102. Sometime thereafter, manufacturing facility 110 forwards dental article 112 to clinic 104 or, alternatively, directly to patient 102. For example, dental article 112 may be an ordered dental article. Patient 102 then wears dental article 112 sequentially over time according to a prescribed schedule in order to reposition the teeth of patient 102. For example, patient 102 may wear dental article 112 for a period of between about 1 week and about 6 weeks, such as between about 2 weeks and about 4 weeks, or about 3 weeks. Optionally, patient 102 may return to clinic 104 for periodic monitoring of the progress of the treatment with dental article 112.

During such periodic monitoring, a clinician may adjust the prescribed schedule of patient 102 for wearing dental article 112 sequentially over time. Monitoring generally includes visual inspection of the teeth of patient 102 and may also include imaging to generate digital dental anatomy data. In some relatively uncommon circumstances, the clinician may decide to interrupt the treatment of patient 102 with dental article 112, for example, by sending the newly generated digital dental anatomy data 106 to manufacturing facility 110 in order to produce a new dental article 112. In the same or different examples, the clinician may send newly generated digital dental anatomy data 106 to manufacturing facility 110 following the completion of the prescribed schedule of the treatment with dental article 112. In addition, following the completion of the prescribed schedule of the treatment with dental article 112, the clinician may request a new dental article from manufacturing facility 110 to continue treatment of patient 102.

Figure 8:
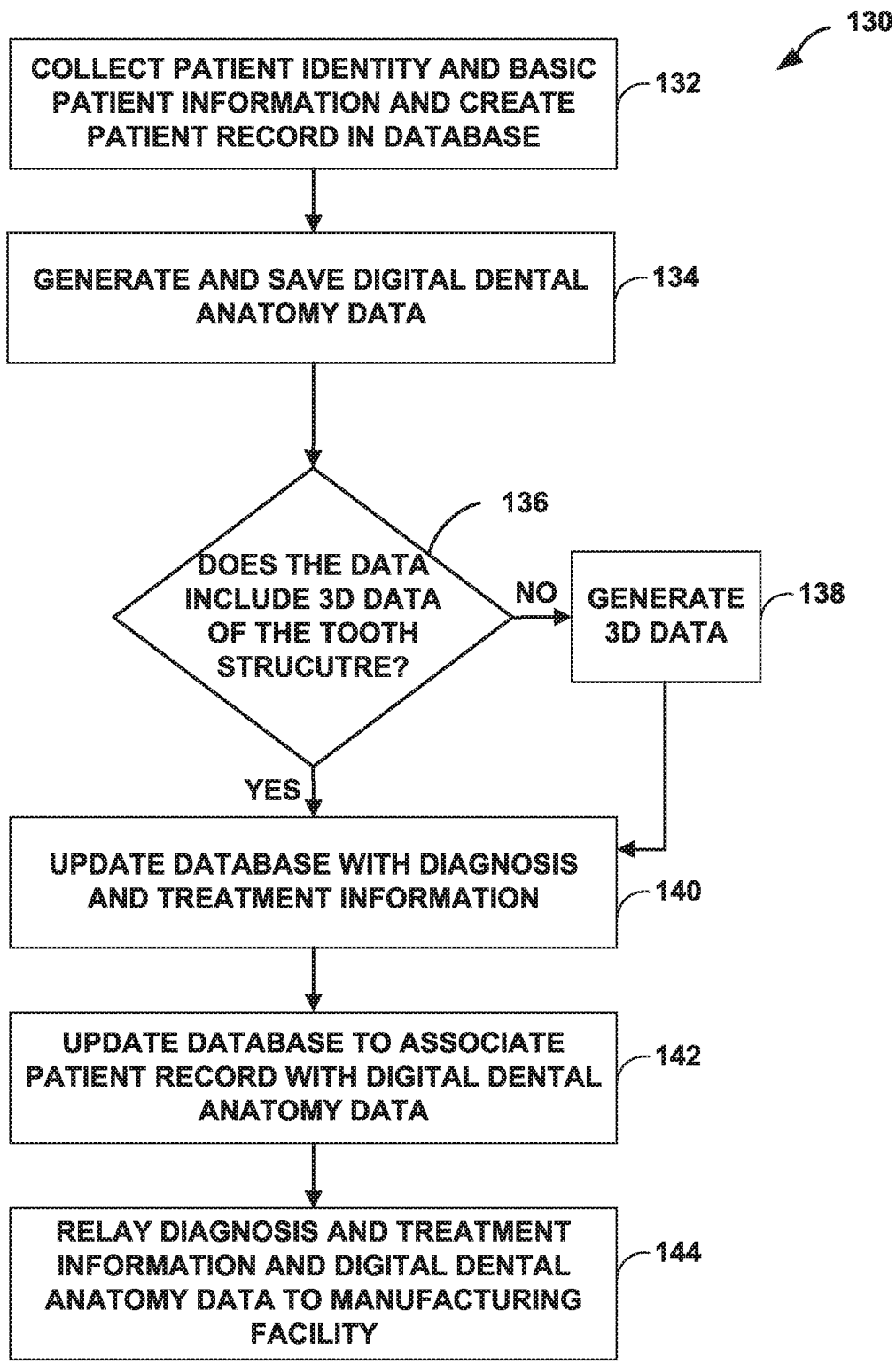
FIG. 8 is a flow diagram illustrating an example process of generating digital dental anatomy data.

FIG. 8 is a flow diagram illustrating process 130 of generating digital dental anatomy data conducted at clinic 104, in accordance with one example of this disclosure. Initially, a practitioner at clinic 104 collects patient identity and other information from patient 102 and creates a patient record (132). As described, the patient record may be located within clinic 104 and optionally configured to share data with a database within manufacturing facility 110. Alternatively, the patient record may be located within a database at manufacturing facility 110 that is remotely accessible to clinic 104 via network 114 or within a database that is remotely accessible by both manufacturing facility 110 and clinic 104.

Next, digital dental anatomy data 106 of patient 102 may be generated using any suitable technique (134), to thereby create a virtual dental anatomy. Digital dental anatomy data 106 may be comprised of a two-dimensional (2D) image and/or a three-dimensional (3D) representation of the dental anatomy. In one example, 3D representations of a dental anatomy are generated using a cone beam computerized tomography (CBCT) scanner, such as an i-CAT 3D dental imaging device (available from Imaging Sciences International, LLC; 1910 N Penn Road, Hatfield, Pa.). Clinic 104 stores the 3D digital dental anatomy data 106 (in the form of radiological images) generated from the CBCT scanner in the database located within clinic 104, or alternatively, within manufacturing facility 110. The computing system processes the digital dental anatomy data 106 from the CBCT scanner, which may be in the form of a plurality of slices, to compute a digital representation of the dental anatomy that may be manipulated within the 3D modeling environment.

If 2D radiological images are used (136), then the practitioner may further generate 3D digital data (138). The 3D digital dental anatomy data 106 may be produced by, for example, forming and subsequently digitally scanning a physical impression or casting of the dental anatomy of patient 102. For example, a physical impression or casting of a dental arch of patient 102 may be scanned using a visible light scanner, such as an OM-3R scanner (available from Laser Design, Inc. of Minneapolis, Minn.) or an ATOS scanner (available from GOM GmbH of Braunschweig, Germany). Alternatively, the practitioner may generate the 3D digital dental anatomy data 106 of the occlusal surface by use of an intra-oral scan of the dental arch of patient 102, or existing 3D tooth data. In one example, the method of forming a digital scan from a casting or an impression described in U.S. Pat. No. 8,491,306, titled, "REGISTERING PHYSICAL AND VIRTUAL TOOTH STRUCTURES WITH PEDESTALS," and issued on Jul. 23, 2013, which is incorporated herein by reference in its entirety, may be used. In the same or different examples, techniques for defining a virtual tooth surface and virtual tooth coordinate system as described in U.S. Pat. No. 8,897,902, titled ORTHODONTIC DIGITAL SETUPS," and published on Dec. 5, 2013 may be used, which is incorporated herein by reference in its entirety. In any case, the digital data are digitally registered within the 3D modeling environment to form a composite digital representation of a dental anatomy, which may include the tooth roots as well as the occlusal surfaces.

In one example, 2D radiological images and the 3D digital data for the occlusal surface of the dental arch are registered by first attaching registration markers (e.g., fiducial markers or a pedestal having known geometry) to the dental anatomy of patient 102 prior to generating both the radiological images and the 3D digital scan. Thereafter, the digital representation of the registration markers within the 2D radiological image and the 3D digital data may be aligned within a 3D modeling environment using registration techniques described in U.S. Pat. No. 8,491,306.

In another example, 3D digital data of the dental anatomy is generated by combining two 3D digital representations of the dental anatomy. For example, a first 3D digital representation may be a relatively low-resolution image of the roots obtained from a CBCT scanner (e.g., an i-CAT 3D dental imaging device) and the second 3D digital representation may be a relatively high-resolution image of the crowns of the teeth obtained from an industrial CT scan of an impression or a visible light (e.g., laser) scan of a casting of the dental arch of the patient. The 3D digital representations may be registered using a software program that enables the 3D representations to be manipulated within a computer environment (e.g., Geomagic Studio software (available from 3D Systems, Inc.; 333 Three D Systems Circle, Rock Hill, S.C.), or alternatively, registration techniques described in U.S. Pat. No. 8,491,306 may be used.

Next, a computer system executing 3D modeling software renders a resultant digital representation of the dental anatomy, including the occlusal surface as well as the root structure of the patient's dental arch. Modeling software provides a user interface that allows the practitioner to manipulate digital representations of the teeth in 3D space relative to the digital representation of the patient's dental arch. By interacting with the computer system, the practitioner generates treatment information, such as by selecting indications of the final positions of individual teeth of patient 102, duration of a respective stage of treatment, or number of treatment stages, the direction or magnitude of forces on the teeth of patient 102 during a stage of treatment, or the like (140). For example, the final positions of individual teeth of patient 102, duration of a respective stage of treatment, or number of treatment stages may affect the direction or magnitude of forces on the teeth of patient 102 at each stage of treatment by dental article 112.

Once the practitioner has finished conveying general information regarding a diagnosis and treatment plan within the 3D environment, the computer system updates the database associated with the patient record to record the prescription data 108 conveying general information regarding a diagnosis and treatment plan as specified by the practitioner (142). Thereafter, the prescription data 108 is relayed to manufacturing facility 110 for manufacturing facility 110 to construct model 50 and dental article 112 (144).

Although described with respect to an orthodontic practitioner located at an orthodontic clinic, one or more of the steps discussed with respect to FIG. 8 may be performed by a remote user, such as a user located at manufacturing facility 110. For example, the orthodontic practitioner may only send radiological image data and an impression or casting of the patient to manufacturing facility 110, where a user interacts with a computer system to develop a treatment plan within a 3D modeling environment. Optionally, a digital representation of the treatment plan within the 3D modeling environment may then be transmitted to the orthodontic practitioner of clinic 104, who may review the treatment plan and either send back his or her approval, or indicate desired changes.

Figure 9:
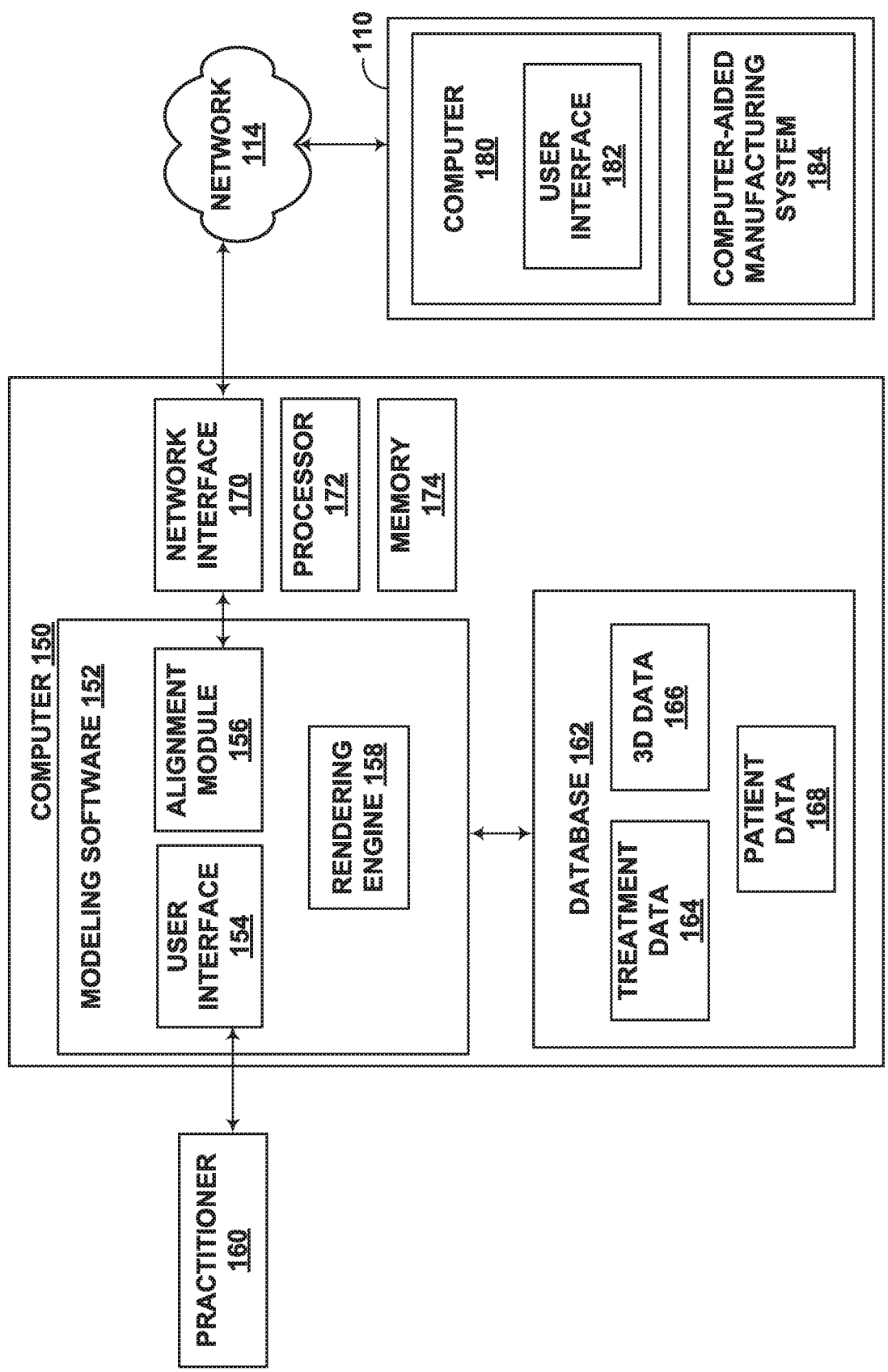
FIG. 9 is a block diagram illustrating an example of a client computer connected to a manufacturing facility via a network to generate digital dental anatomy data.

FIG. 9 is a block diagram illustrating an example of a client computer 150 connected to manufacturing facility 110 via network 114. In the illustrated example, client computer 150 provides an operating environment for modeling software 152. Modeling software 152 presents a modeling environment for modeling and depicting the 3D representation of the teeth of patient 102. In the illustrated example, modeling software 152 includes user interface 154, alignment module 156, and rendering engine 158.

User interface 154 provides a graphical user interface (GUI) that visually displays the 3D representation of patient's 102 teeth. In addition, user interface 154 provides an interface for receiving input from practitioner 160 of clinic 104, e.g., via a keyboard and a pointing device, a touchscreen, or the like, for manipulating patient's 102 teeth within the modeled dental arch.

Modeling software 152 may be accessible to manufacturing facility 110 via network interface 170. Modeling software 152 interacts with database 162 to access a variety of data, such as treatment data 164, 3D data 166 relating to the dental anatomy of patient 102, and patient data 168. Database 162 may be represented in a variety of forms including data storage files, lookup tables, or a database management system (DBMS) executing on one or more database servers. The database management system may be a relational (RDBMS), hierarchical (HDBMS), multi-dimensional (MDBMS), object oriented (ODBMS or OODBMS) or object relational (ORDBMS) database management system. The data may, for example, be stored within a single relational database, such as SQL Server from Microsoft Corporation. Although illustrated as local to client computer 150, database 162 may be located remote from the client computer 150 and coupled to the client computer 150 via a public or private network, e.g., network 114.

Treatment data 164 describes diagnosis or repositioning information for the teeth of patient 102 selected by practitioner 160 and positioned within the 3D modeling environment. For example, treatment data 164 may include the modeling data of the patient's dental anatomy that may result in a selected magnitude and direction of force vectors to be applied to each tooth by dental article 112 throughout the treatment plans.

Patient data 168 describes a set of one or more patients, e.g., patient 102, associated with practitioner 160. For example, patient data 168 specifies general information, such as a name, birth date, and a dental history, for each patient 102.

Rendering engine 158 accesses and renders 3D data 166 to generate the 3D view presented to practitioner 160 by user interface 154. More specifically, 3D data 166 includes information defining the 3D objects that represent each tooth (optionally including roots), and jaw bone within the 3D environment. Rendering engine 158 processes each object to render a 3D triangular mesh based on viewing perspective of practitioner 160 within the 3D environment. User interface 154 displays the rendered 3D triangular mesh to practitioner 160, and allows practitioner 160 to change viewing perspectives and manipulate objects within the 3D environment.

U.S. Pat. No. 8,194,067, titled, "PLANAR GUIDES TO VISUALLY AID ORTHODONTIC APPLIANCE PLACEMENT WITHIN A THREE-DIMENSIONAL (13D) ENVIRONMENT," issued on Jun. 5, 2012, and U.S. Pat. No. 7,731,495, titled, "USER INTERFACE HAVING CROSS SECTION CONTROL TOOL FOR DIGITAL ORTHODONTICS," issued on Jun. 8, 2010, describe other examples for computer systems and 3D modeling software having user interfaces that may be used with the techniques described herein, each of which are incorporated by reference in their entireties.

Client computer 150 includes processor 172 and memory 174 in order to store and execute modeling software 152. Memory 174 may represent any volatile or non-volatile storage elements. Examples include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include non-volatile storage, such as a solid state drive (SDD), a hard-disk, magnetic tape, a magnetic or optical data storage media, a compact disk (CD), a digital versatile disk (DVD), a Blu-ray disk, and a holographic data storage media.

Processor 172 represents one or more processors such as a general-purpose microprocessor, a specially designed processor, an application specific integrated circuit (ASIC), a field programmable gate array (FPGA), a collection of discrete logic, or any type of processing device capable of executing the techniques described herein. In one example, memory 174 may store program instructions (e.g., software instructions) that are executed by processor 172 to carry out the techniques described herein. In other examples, the techniques may be executed by specifically programmed circuitry of processor 172. In these or other ways, processor 172 may be configured to execute the techniques described herein.

Client computer 150 is configured to send a digital representation of a 3D dental anatomy of a patient, and optionally, treatment data 164 and/or patient data 168 to computer 180 of manufacturing facility 110 via network 114. Computer 180 includes user interface 182. User interface 182 provides a GUI that visually displays the 3D representation of the digital model of teeth. In addition, user interface 182 provides an interface for receiving input from a user, e.g., via a keyboard and a pointing device, for manipulating a patient's teeth within the digital representation of the 3D dental anatomy of the patient.

Computer 180 may further be configured to automatically determine dimensions and shapes needed for constructing model 50 and dental article 112 to reposition the one or more teeth from their initial positions to final positions when dental article 112 is worn by the patient. Computer 180 may further determine the positioning for additional dental components 66 other than core component 14. Computer 180 may transmit, or otherwise send, a digital model for model 50 to computer-aided manufacturing system 184 for production of model 50 and/or dental article 112.

For example, computer 180 may be configured to determine at least one of the dimensions and shapes for model 50. Computer 180 may present a digital representation of model 50 and/or dental article 112 for the user to review, including review of dimensions and shapes. Alternatively, or additionally, computer 180 may accept input from a user to determine dimensions and shapes of model 50 and/or dental article 112 for patient 102. For example, the user input may influence at least one of an automatically determined dimension or shape.

Client computer 150 and computer 180 are merely conceptual representations of an example computer system. In some examples, the functionalities described with respect to client computer 150 and/or computer 180 may be combined into a single computing device or distributed among multiple computing devices within a computer system. For example, cloud computing may be used for digital design of dental appliances described herein. In one example, the digital representations of dental anatomy are received at one computer at the clinic, while a different computer, such as computer 180, is used to determine the shapes and dimensions of a removable dental appliance. In addition, it may not be necessary for that different computer, such as computer 180, to receive all of the same data in order for it to determine shapes and dimensions. Shapes and dimensions may be determined, at least in part, based on knowledge derived through analysis of historical cases or virtual models of exemplary cases, without receiving a complete 3D representation of the case in question. In such an example, data transmitted between client computer 150 and computer 180, or otherwise utilized to design a custom dental appliance may be significantly less than the complete data set representing a complete digital dental model of a patient.

Figure 10:
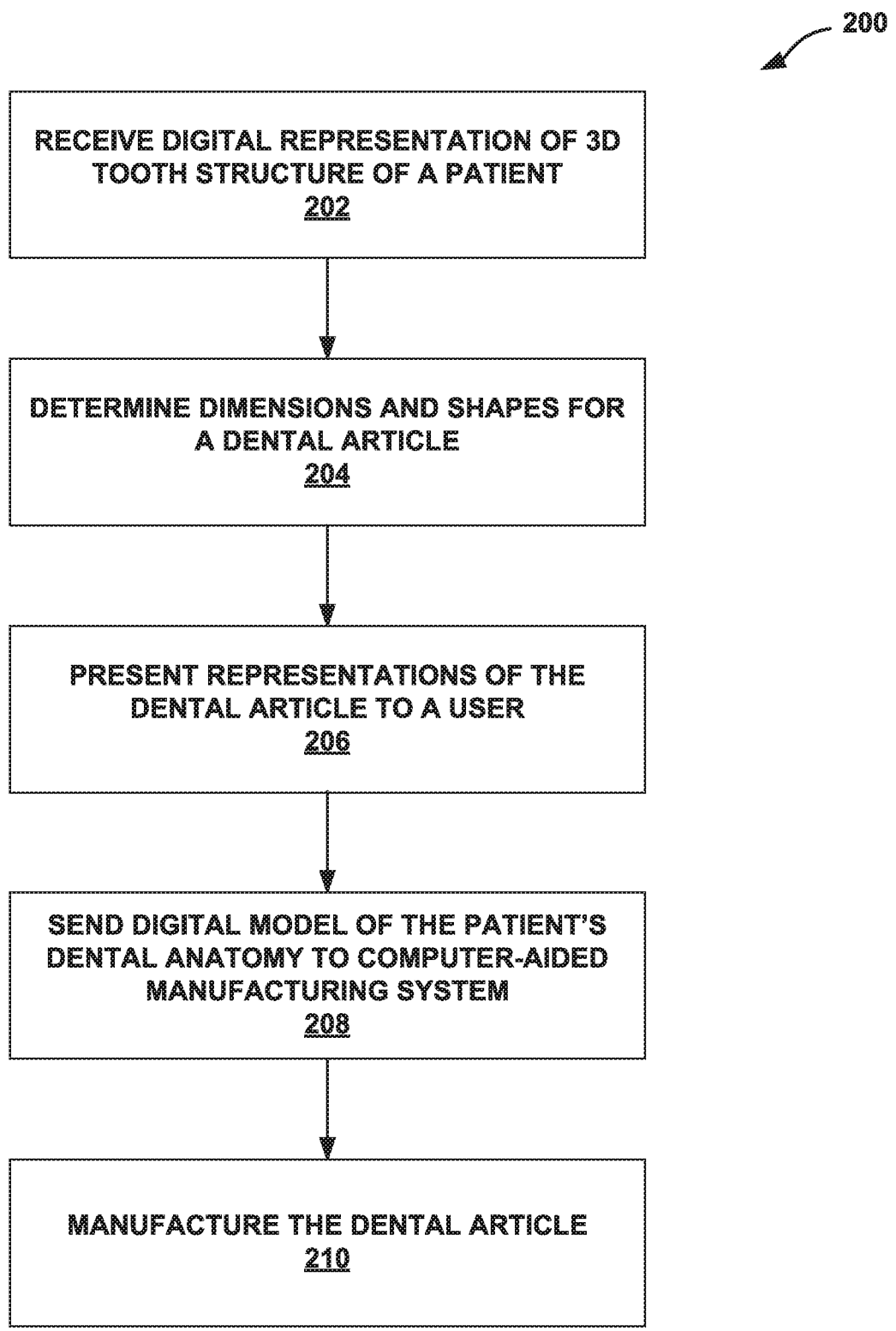
FIG. 10 is a flow diagram illustrating a process conducted at a manufacturing facility for construction of a dental article.

FIG. 10 is a flow diagram illustrating process 200 conducted at manufacturing facility 110 for construction of dental article 112. In some examples, dental article 112 may include one or more of dental article 112. Computer 180 at manufacturing facility 110 receives digital dental anatomy data 106 including initial positions of one or more teeth of the patient and prescription data 108 (202) from clinic 104. Alternatively, computer 180 may retrieve the information from a database located within or otherwise accessible by computer 180. A trained user associated with computer 180 may interact with a computerized modeling environment miming on computer 180 to develop a treatment plan relative to the digital representation of the patient's dental anatomy and generate prescription data 108, if clinic 104 has not already done so. In other examples, computer 180 may automatically develop a treatment plan based solely on the patient's dental anatomy and predefined design constraints.

Once computer 180 receives patient's dental anatomy, computer 180 determines dimensions and shapes for dental article 112 for the patient (204). The dimensions and shapes of the removable dental appliance are configured to reposition the one or more teeth of the patient from their initial positions to final positions when the removable dental appliance is worn by the patient. In the same or additional examples, computer 180 determines dimensions and shapes of dental article 112 for the patient configured to be worn in series.

In some examples, determining dimensions and shapes for dental article 112 includes selecting, with computer 180, the dimensions and shapes for dental article 112 according to a set of predefined design constraints. The set of predesigned design constraints may include one or more factors, including, but not limited to, a minimum and a maximum localized force applied to one or more of the surrounded teeth, a minimum and a maximum rotational force applied to one or more of the surrounded teeth, a minimum and a maximum translational force applied to one or more of the surrounded teeth, a minimum and a maximum total force applied to one or more of the surrounded teeth, and a minimum and a maximum strain applied to the removable dental appliance, when dental article 112 is worn by the patient and the surrounded teeth are in their initial positions. Minimum applied forces are necessary to cause pressure on the periodontal ligament sufficient to result in bone remodeling and tooth movement.

Computer 180 may use finite element analysis (FEA) techniques to analyze forces on a patient's teeth as well as dental article 112 during the determination of the dimensions and shapes of dental article 112. For example, computer 180 may apply FEA to a solid model of the patient's teeth as the modeled teeth move from their initial positions to their final positions representing a treatment including an ordered dental article. Computer 180 may use FEA to select the appropriate structure for dental article 112 to apply the desired forces on the teeth. In addition, computer 180 may use a virtual articulator to determine contact points between the teeth throughout the movement of the modeled teeth during the treatment. Computer 180 may further include occlusal contact forces, such as interdigitation forces, in the FEA forces analysis in combination with forces from dental article 112 during the design of dental article 112. Computer 180 may further determine an order in which teeth are to be moved to optimize the application of forces, reduce treatment time, improve patient comfort, or the like.

In some examples, determining dimensions and shapes of removable dental article 112 includes selecting, with computer 180 thicknesses of core component 14, placement of optional coating layer 22, inclusion and placement of additional dental components 66, 68 to provide a stiffness suitable to reposition the one or more teeth of the patient from their initial positions to final positions when dental article 112 is worn by the patient.

The dimensions and shapes of dental article 112 may be presented to a user via user interface 182 of computer 180 (206). In examples in which dimensions and shapes of dental article 112 are presented to a user via user interface 182, the user may have the opportunity to adjust the design constraints or directly adjust the dimensions and shapes of dental article 112 before the design data is sent to computer-aided manufacturing system 184. In some examples, the dimensions and shapes of dental article 112 may be presented to a user by computer 180 directly as dental article 112 is manufactured by computer-aided manufacturing system 184. For example, computer 180 may send a digital model of model 50 to be used in forming dental article 112 to computer-aided manufacturing system 184, and computer-aided manufacturing system 184 manufactures model 50 according to the digital model from computer 180 which is used in CVD application of the parylene. In some examples, computer-aided manufacturing system 184 may manufacture a portion of dental article 112 such as one or more of optional coatings 22 or additional dental components 66 and 68 used in constructing dental article 112.

However, even in examples where the dimensions and shapes of model 50 and/or dental article 112 for the patient may be presented to a user via user interface 182 of computer 180, following user approval, computer 180 sends a digital model of model 50 and/or dental article 112 to computer-aided manufacturing system 184 (208), and computer-aided manufacturing system 184 manufactures model 50 and/or portions of dental article 112 according to the digital model from computer 180 (210). In some examples, computer-aided manufacturing system 184 may include a 3D printer.

In other examples, model 50 may include printing representations of the oral anatomy (e.g., teeth) of the patient with the 3D printer, thermoforming portions of dental article 112 over the representations of the teeth, CVD application of the core component 14, and trimming excess material (optionally automated by CNC or robotic machinery such as, e.g., an end mill or LASER cutter). The representations of the patient's teeth may include raised surfaces to facilitate forming portions or components of dental article 112.

In some examples, the techniques described with respect to FIG. 10 may be embodied within a computer-readable storage medium, such as a computer-readable storage medium of computer 150, computer 180, or both. The computer-readable storage medium may store computer-executable instructions that, when executed, configure a processor to perform the techniques described with respect to FIG. 10.

Following the design of dental article 112, manufacturing facility 110 fabricates dental article 112 in accordance with the digital dental anatomy data 106 and prescription data 108 (210). Construction of the final dental article 112 may include 3D printing, CVD application, thermoforming, injection molding, lost wax casting, 5-axis milling, laser cutting, hybrid plastic and metal manufacturing techniques, such as snap-fitting and overmolding, as well as other manufacturing techniques.

Figure 11:
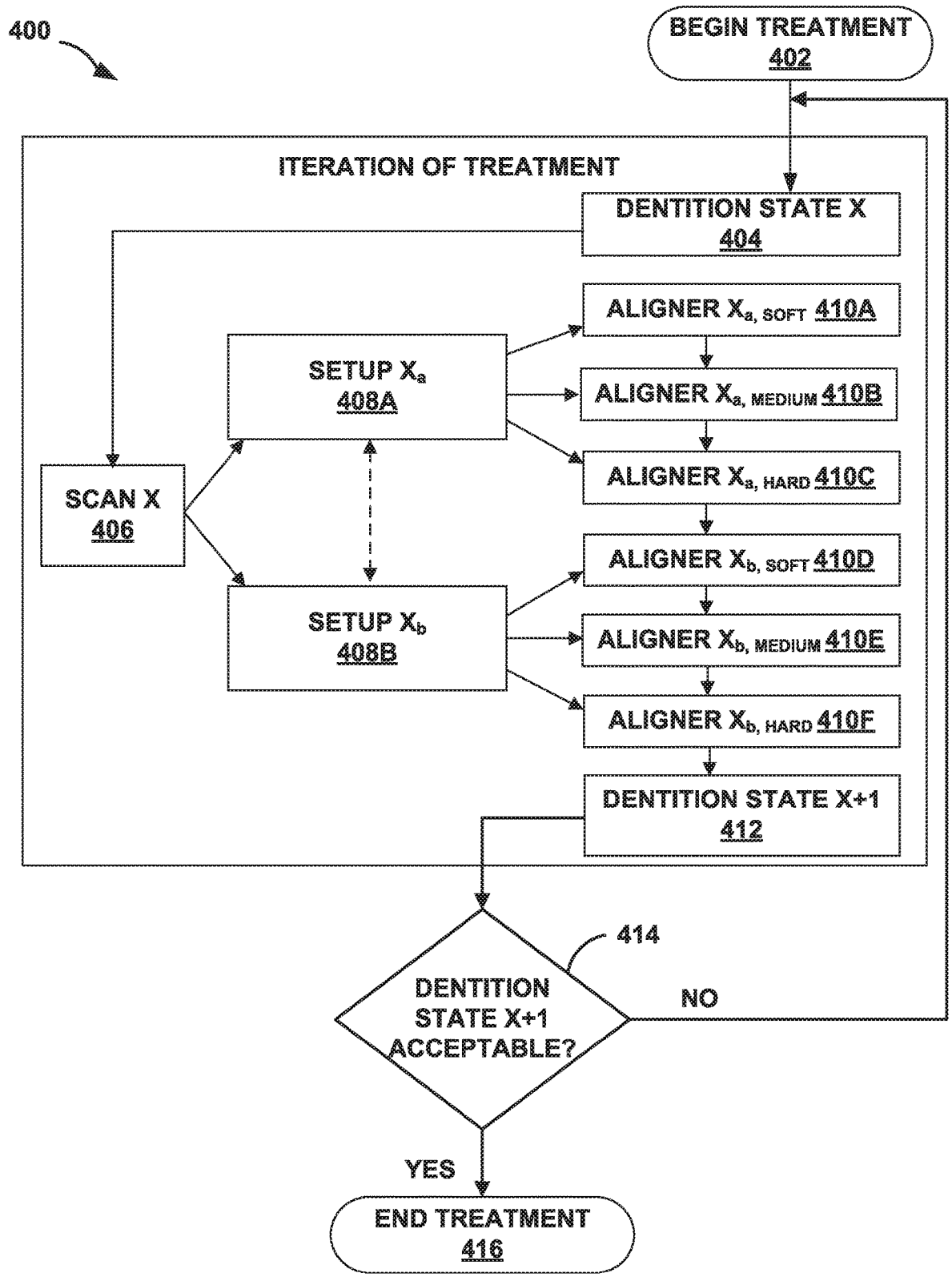
FIG. 11 is a flow diagram illustrating successive iterations of treatment using an ordered dental article.

FIG. 11 is a flow diagram 400 illustrating successive iterations of treatment using an ordered dental article. The ordered dental article is configured to reposition one or more teeth of a patient. In some examples, the ordered dental article may include one or more of dental article 112.

Treatment begins with the first iteration of treatment (402). At the beginning of the first iteration of treatment, the patient's teeth are at their initial positions as represented by detention state X (404). A scan of the patient's teeth, for example, as described above, are taken to facilitate the design of the ordered dental article (406). From the scan of patient's teeth, a computer, e.g., computer 150, determines two different shape and dimensions for dental article 112 in an ordered set: first setup $X_a$ 408A and second setup $X_b$ 408B. Example techniques for creating a digital model of a patient's teeth are described in U.S. Pat. No. 8,738,165 to Cinader et al., titled, "METHODS OF PREPARING A VIRTUAL DENTITION MODEL AND FABRICATING A DENTAL RETAINER THEREFROM," and issued on May 27, 2014. U.S. Pat. No. 8,738,165 is herein incorporated by reference in its entirety. The computer may determine first setup $X_a$ 408A and second setup $X_b$ 408B by first adjusting the digital model of the patient's teeth to create a model of the desired position of the patient's teeth following the therapy. Then, the computer may create the shape and dimensions for model 50 and/or dental article 112 in an ordered set based on the time and forces required to move the patient's teeth from the initial positions to their desired positions. The modeled forces applied by dental article 112 in the ordered set may further be based on the incremental positional movements of the patient's teeth during the treatment. In this manner, the computer may design dental article 112 in the ordered set according to expected forces applied on the teeth in the predicted positions of the teeth at the time during the treatment dental article 112 in the ordered set is to be worn by the patient.

In some examples, at least one, such as three, different dental articles 112 can be manufactured using each of first setup $X_a$ 408A and second setup $X_b$ 408B to produce at least two, such as six, dental articles 112. For example, first setup $X_a$ 408A may be used to manufacture first dental article 112 $X_{a, SOFT}$ 410A, second dental article 112 $X_{a, MEDIUM}$ 410B, and third dental article 112 $X_{a, HARD}$ 410C; and second setup $X_b$ 408B may be used to manufacture fourth dental article 112 $X_{b, SOFT}$ 410D, fifth dental article 112 $X_{b, MEDIUM}$ 410E, and sixth dental article 112 $X_{b, HARD}$ 410F. First, second, and third dental articles 112 410A to 410C may comprise different stiffness characteristics by, for example, modifying the composition of core component 14, composition of coatings 22, composition of the other dental components (e.g., 66 and 68), relative thicknesses or the like. For example, the second and third dental articles 112 410B and 410C may have higher stiffness characteristics than first dental article 112 410A, and third dental article 112 410C may have higher stiffness characteristics than second dental article 112 410B. Similarly, the fourth, fifth, and sixth dental articles 112 410D to 410F may comprise different stiffness characteristics.

Dental articles 112 410A to 410F may be worn in sequence over time by the patient. For example, each of dental articles 112 410A to 410F may be worn between about 1 week and about 6 weeks, such as between about 2 weeks and about 4 weeks, or about 3 weeks. Following the treatment plan using dental articles 112 410A to 410F, the patient's teeth may be at their final positions for the first iteration of treatment as represented by detention state X+1 (412).

Once patient's teeth are at or near dentition state X+1, the patient may return to the clinician who may evaluate the result of the first iteration of treatment (414). If the first iteration of treatment has resulted in acceptable final positions of the patient's teeth, then the treatment may be ended (416). However, if the first iteration of treatment did not result in acceptable final positions of the patient's teeth, one or more additional iterations of treatment may be performed. To begin the next iteration of treatment, the clinician may take another scan of the patient's teeth to facilitate the design of a subsequent ordered dental article (406). In some examples, evaluation of the result of the first iteration of treatment may include taking another scan of the patient's teeth, in which case beginning the next iteration of treatment may simply involve forwarding the digital model of the patient's teeth to a manufacturing facility so that another dental article set may be manufactured for the patient based on the new positions of the patient's teeth. In yet other examples, the newly acquired scan may be used to create one or more iterations of dental articles 112 in the clinician's facility.

The techniques of FIG. 11 represent one specific example, and a variety of modifications may be made to the techniques of FIG. 11 within the spirit of this disclosure. As other examples, each dental article 112 in the ordered dental article may have unique shapes and dimensions, and each dental article 112 in the ordered dental article may be made of material having substantially the same or similar stiffness characteristics. As another example, each dental article 112 in the ordered dental article may include differing selected dimensions and/or shapes.

Embodiments

A. A dental article comprising at least one segment defining a complex three-dimensional shape configured to follow contours of an oral anatomy, wherein the at least one segment comprises a core component, wherein the core component comprises a majority of parylene.

B. The dental article of embodiment B, wherein the core component comprises at least 95 percent by weight (wt. %) parylene.

C. The dental article of embodiment A or B, wherein the at least one segment comprises at least 95 wt. % parylene.

D. The dental article of any one of embodiments A to C, wherein the at least one segment defines a segment thickness measured perpendicular from a surface of the at least one segment configured to contact the oral anatomy of a patient, wherein at least 80% of the segment thickness consists of the core component.

E. The dental article of any one of embodiment A to D, wherein the core component defines a core thickness, wherein the core thickness defines a thickness variability of less than about ±5% across the entire core component.

F. The dental article of any one of embodiments A to E, wherein the core component defines a structural member of the dental article configured to exert a corrective force on teeth of a patient when worn to urge a dental arrangement of the patient toward a new desired configuration G. The dental article of any one of embodiments A to F, wherein the at least one segment further comprises at least one inorganic coating on the core component.

H. The dental article of embodiment G, wherein the at least one inorganic coating comprises a metal oxide.

I. The dental article of embodiment H, wherein the metal oxide comprises at least one of metal oxide chosen from silver oxide, zinc oxide, copper oxide, titanium oxide, aluminum oxide, and alloys thereof.

J. The dental article of embodiment I, wherein the metal oxide is chosen from silver doped zinc oxide, silver doped and aluminum doped zinc oxide, silver doped titanium oxide, aluminum doped zinc oxide, titanium oxide, and silver doped and copper doped zinc oxide.

K. The dental article of any one of embodiments A to J, wherein the at least one segment further comprises at least polymeric hardcoat on the core component.

L. The dental article of any one of embodiments A to K, wherein the at least one segment defines a portion of a dental tray aligner, a night guard, a dental attachment, a retainer, a palatal expander, or a mouth guard.

M. The dental article of any one of embodiments A to L, wherein the dental article comprises at least 95 wt. % parylene.

N. The dental article of any one of embodiments A to M, wherein the complex three-dimensional shape is configured to follow contours of the oral anatomy of at least one tooth.

O. The dental article of any one of embodiment A to N, further comprising a dental component attached to the at least one segment.

P. The dental article of embodiment O, wherein the dental component comprises a core material other than parylene.

Q. The dental article of embodiment O or P, wherein the dental component comprises a coating layer comprising parylene.

R. The dental article of embodiment Q, wherein the coating layer comprising parylene encapsulates the dental component.

S. The dental article of embodiment Q or R, wherein the coating layer comprising parylene is integrally formed with the core component.

T. The dental article of embodiment Q or R, wherein the dental component comprises a portion of a palatal expander or a dental tray aligner.

U. A method comprising: forming a three-dimensional model of an oral anatomy of a patient; forming a dental article comprising at least one segment defining a complex three-dimensional shape configured to follow contours of the oral anatomy, wherein forming the at least one segment comprises: depositing a layer comprising parylene on the model, wherein the layer comprises a majority of parylene, and using the layer comprising parylene to form a core component of the at least one segment.

V. The method of embodiment U, wherein forming a dental article further comprises: after depositing the layer comprising parylene on the model, trimming the layer to a selected shape to form the core component; and separating the core component from the model.

W. The method of embodiment V, wherein forming a three-dimensional model of the oral anatomy of a patient comprises three-dimensional printing the model or molding the model.

X. The method of any one of embodiment U to W, wherein depositing a layer comprising parylene on the model comprises chemical vapor depositing the layer comprising parylene.

Y. The method of any one of embodiments U to X, further comprising coating the model with a release agent prior to depositing the layer comprising parylene on the model.

Z. The method of any one of embodiments U to Y, wherein forming the dental article comprises forming a dental tray aligner, a night guard, a dental attachment, a retainer, a palatal expander, or a mouth guard AA. The method of any one of claims U to Z, further comprising coating the core component with an inorganic material or a polymeric hardcoat.

BB. The method of embodiment AA, wherein coating the core component comprises coating the core component with the inorganic material, wherein the inorganic material comprises at least one of a metal, a metal alloy, a metal oxide, a metal salt, a ceramic, a glass, or a mineral.

CC. A dental article comprising at least one segment defining a complex three-dimensional shape configured to follow contours of an oral anatomy, wherein the at least one segment comprises a core component, wherein the core component is formed by depositing parylene from a chemical vapor deposition process over a model of an oral anatomy.

DD. The dental article of embodiment CC, wherein the core component comprises at least 95 percent by weight (wt. %) parylene.

EE. The dental article of embodiment CC or DD, wherein the at least one segment defines a segment thickness measured perpendicular from a surface of the at least one segment configured to contact the oral anatomy of a patient, wherein at least 80% of the segment thickness consists of the core component.

FF. The dental article of any one of embodiments CC to EE, wherein the core component defines a core thickness, wherein the core thickness defines a thickness variability of less than about ±5% across the entire core component.

GG. The dental article of any one of embodiments CC to FF, wherein the at least one segment further comprises at least one inorganic coating on the core component.

HH. The dental article of embodiment GG, wherein the at least one inorganic coating comprises a metal oxide.

II. The dental article of embodiment HH, wherein the metal oxide comprises at least one metal oxide chosen from silver oxide, zinc oxide, copper oxide, titanium oxide, aluminum oxide, and alloys thereof.

JJ. The dental article of embodiment II, wherein the metal oxide is chosen from silver doped zinc oxide, silver doped and aluminum doped zinc oxide, silver doped titanium oxide, aluminum doped zinc oxide, titanium oxide, and silver doped and copper doped zinc oxide.

KK. The dental article of any one of embodiments CC to JJ, wherein the at least one segment further comprises at least a polymeric hardcoat on the core component.

LL. The dental article of any one of embodiments CC to KK, wherein the least one segment defines a portion of a dental tray aligner, a night guard, a dental attachment, a retainer, a palatal expander, or a mouth guard.

MM. The dental article of any one of embodiment CC to LL, wherein the dental article comprises at least 95 wt. % parylene.

NN. The dental article of any one of embodiments CC to MM, wherein the model of the oral anatomy used to form the core component included the shape of at least one tooth such that the complex three-dimensional shape follows contours of the at least one tooth.

OO. The dental article of any one of embodiments CC to NN, further comprising a dental component attached to the at least one segment.

PP. The dental article of embodiment OO, wherein the dental component comprises a core material other than parylene.

QQ. The dental article of embodiment OO or PP, wherein the dental component comprises a coating layer comprising parylene that encapsulates the dental component.

RR. The dental article of embodiment QQ, wherein the coating layer comprising parylene is integrally formed with the core component.

SS. The dental article of any one of claims OO to RR, wherein the dental component comprises a portion of a palatal expander or a dental tray aligner.

TT. A method comprising: receiving, by a computing device, a digital representation of a three-dimensional (3D) oral anatomy of a patient, the oral anatomy providing initial positions of one or more teeth of the patient; determining, by the computing device, dimensions and shapes for a dental article for the patient, wherein the dental article comprises at least one segment configured to at least partially surround a plurality of teeth to define complex 3D shape configured to follow contours of the oral anatomy, wherein the dimensions and shapes of the dental article are configured to reposition the one or more teeth of the patient from their initial positions to adjusted positions when the dental article is worn by the patient; forming a 3D model of an oral anatomy based on the dimensions and shapes for the dental article; and forming the dental article, wherein forming the at least one segment of the dental article comprises: depositing a layer comprising parylene on the 3D model, wherein the layer comprises a majority of parylene, and trimming the layer comprising parylene to a selected shape to form a core component of the at least one segment.

Examples

Example 1—The stain resistant properties of parylene-C coated polyurethane tray were tested in comparison to a sample of polyurethane tray which is used in conventional dental articles. Both test samples were placed in coffee solution at 60° C. overnight. X-Rite Color i7 spectrophotometer available from Grand Rapids, Mich., USA was used to quantify the color parameters (L*, a*, b*) for each of the test samples. The results of the stain test are reflected in Table 1.

TABLE 1

| Sample | Pre-Coffee | | | Post-Coffee (24 hrs. @ 60° C) | | | Shift | | | |
|---|---|---|---|---|---|---|---|---|---|---|
| | L* | a* | b* | L* | a* | b* | L* | a* | b* | ΔE |
| Polyurethane | 91.4 | −5.8 | 11.9 | 77.9 | 4.1 | 50.7 | −13.5 | 9.9 | 38.8 | 42.3 |
| Parylene | 89.3 | −6.3 | 20.4 | 86.6 | −5.4 | 22.0 | −2.7 | 0.9 | 1.6 | 3.2 |

Example 2—Parylene-C was deposited over two three-dimensional models of a dental anatomy that had underwent various surface treatments. The composition of the 2 models is reflected in Table 2 below. Model A was printed on a Prodways LD7000 printer, manufactured by Prodways Technologies. Model B was hollow printed on an Asiga HD, manufactured by Asiga using and the hollow portion was filled with RTV Silicone to protect the inner surface of the model from parylene.

TABLE 2A

Materials for Model A and Model B

| Material | Description | Source |
|---|---|---|
| D-Zethacrylat | Ethoxylated(4) bisphenol-A dimethacrylate | synthesized |
| HPMA | 2-hydroxypropyl methacrylate | |
| CAPA 2043 | polycaprolactone diols | Perstorp Polyols, Inc., Toledo, OH |
| IRGACURE 819 | phenylbis(2,4,6-trimethylbenzoyl)-phenylphosphineoxide | BASF Corporation |
| SOLVAPERM Red PFS | Soluble dye | Clariant, Charlotte, NC, USA |
| MACROLEX Violet B | Solvent Violet 13, dye | Lanxess AG, Cologne, Germany |
| EXOTHANE 108 | Urethane (meth)acrylate oligomer | Esstech Inc, (Essington, PA, USA) |
| DESMA | DESMA is described in paragraph [0135] and Table 3 of EP2167013B1 (Hecht et al.). | 3M Company, St. Paul, MN |
| TEGDMA | Triethyleneglycol dimethacrylate | Sigma-Aldrich (St. Louis, MO) |
| IRGACURE TPO | 2,4,6-Trimethylbenzoyldiphenylphosphine oxide (photo-initiator) | BASF (Wyandotte, MI) |
| BHT | 2,6-Di-tert-butyl-4-methyl-phenol (Butylated hydroxytoluene. BHT) | Fluka Analytical (St. Louis, MO) |
| TINOPAL OB | 2,5-Thiophenediylbis(5-tert-butyl-1,3-benzoxazole) (optical brightener) | BASF, Wyandotte, MI |

TABLE 2B

Compositions of Model A and B

| Model A | Weight % | Model B | Weight % |
|---|---|---|---|
| D-Zethacrylat | 83.6 | EXOTHANE | 70 |
| HPMA | 10 | DESMA | 5 |
| CAPA 2043 | 4.7 | TEGDMA | 25 |
| IRGACURE 819 | 1.6 | IRGACURE TPO | 0.5 |
| SOLVAPERM Red PFS | 0.08 | BHT | 0.05 |
| MACROLEX Violet B | 0.04 | TINOPAL OB | 0.05 |

Representative Model A's were treated with various release coatings as provided in Table 3.

TABLE 3

| Model Name | Plasma coating | Treatment after plasma coating |
|---|---|---|
| Model A-0 (Control) | No coating | No treatment |
| Model A-1 | Diamond-like glass (500 standard cubic centimeters per | Dip coat with NOVEC 2202 Electronic |

TABLE 3-continued

| Model Name | Plasma coating | Treatment after plasma coating |
|---|---|---|
| | minute (sccm) $O_2$, TMS*, 300 W, 30 sec) | Grade Coating available from 3M Company, heat at 60° C. for 30 minutes |
| Model A-2 | Diamond like glass (500 sccm $O_2$, TMS, 300 W, 30 sec) | Dip coated with GP-522 PDMS*, 1% in Heptane, heat at 60° C. for 30 minutes |
| Model A-3 | $C_3F_8$ - 186 sccm, 1500 W, 150 sec | None |

*TMS = tetramethylsilane, available as a liquid from Aldrich Chemical Company, Milwaukee, WI.
*PDMS = polydimethylsiloxane Representative Model B's were treated with various release coatings as provided in Table 4.

TABLE 4

| Model Name | Plasma coating |
|---|---|
| Model B-0 (Control) | No coating |
| Model B-1 | Dip coated with LOCTITE FREKOTE 700-NC available from Henkel Corporation |

The dental models were then coated with a layer of parylene via chemical vapor deposition. The select test samples were placed in a vacuum chamber, which was evacuated to a pressure of about 0.1 Torr. A solid form of para-xylylene dimer was then heated to produce a monomeric para-xylylene gas that was introduced into the vacuum deposition chamber containing the test samples. As monomeric gas contacted the surfaces of the test samples, the gas polymerized to form Parylene C (e.g., poly(para-xylylene) modified by the substitution of a chlorine atom for one of the aromatic hydrogens). The process was continued until a layer thickness of about 25 μm was obtained. The parylene coating chamber was run for 6 hours (13 times) in batches until the monomer ran out.

An 80-μm thick layer of parylene was applied to Model A-0, Model A-1, Model A-2, and Model A-3. Of those, the layer of parylene on Model A-1, Model A-2, and Model A-3 and were able to be removed from the models with minor tearing if any. The layer of parylene on Model A-0 experienced some tearing during its removal. An 80-μm thick layer of parylene was applied to Model B-0 and Model B-1. Both the layers of parylene on Model B-0 and Model B-1 experienced some tearing during removal. Table 5 reflects the results of the study.

TABLE 5

| | Model A-0 | Model A-2 | Model A-1 | Model A-3 | Model B-0 | Model B-1 |
|---|---|---|---|---|---|---|
| Parylene Thickness | 80 μm | 80 μm | 80 μm | 80 μm | 80 μm | 80 μm |
| Ease of Removal | Poor | Good | Good | Good | Poor | Poor |
| Damage by Removal | Significant Tearing | None | Minor Tear | Minor Tear | Significant Tearing | Minor Tear |

Various examples have been described. These and other examples are within the scope of the following claims.

What is claimed is:

1. A dental article comprising at least one segment defining a complex three-dimensional shape configured to follow contours of an oral anatomy, wherein the at least one segment comprises a core component, wherein the core component comprises a majority of parylene.

2. The dental article of claim 1, wherein the core component is formed by depositing parylene from a chemical vapor deposition process over a model of an oral anatomy.

3. The dental article of claim 1, wherein the core component comprises at least 95 percent by weight (wt. %) parylene.

4. The dental article of claim 1, wherein the at least one segment comprises at least 95 wt. % parylene.

5. The dental article of claim 1, wherein the at least one segment defines a segment thickness measured perpendicular from a surface of the at least one segment configured to contact the oral anatomy of a patient, wherein at least 80% of the segment thickness consists of the core component.

6. The dental article of claim 1, wherein the core component defines a core thickness, wherein the core thickness defines a thickness variability of less than about ±5% across the entire core component.

7. The dental article of claim 1, wherein the at least one segment further comprises at least one inorganic coating on the core component.

8. The dental article of claim 7, wherein the at least one inorganic coating comprises a metal oxide chosen from silver oxide, zinc oxide, copper oxide, titanium oxide, aluminum oxide, and alloys thereof.

9. The dental article of claim 8, wherein the metal oxide is chosen from silver doped zinc oxide, silver doped and aluminum doped zinc oxide, silver doped titanium oxide, aluminum doped zinc oxide, titanium oxide, and silver doped and copper doped zinc oxide.

10. The dental article of claim 1, wherein the at least one segment further comprises at least polymeric hardcoat on the core component.

11. The dental article of claim 1, wherein the complex three-dimensional shape is configured to follow contours of the oral anatomy of at least one tooth.

12. The dental article of claim 1, further comprising a dental component attached to the at least one segment, wherein the dental component comprises a coating layer comprising parylene that encapsulates the dental component.

13. The dental article of claim 1 further comprising a dental component attached to the at least one segment, wherein a coating layer comprising parylene is integrally formed with the core component.

14. The dental article of claim 12, wherein the dental component comprises a portion of a palatal expander or a dental tray aligner.

15. A method comprising:
 forming a three-dimensional model of an oral anatomy of a patient;
 forming a dental article comprising at least one segment defining a complex three-dimensional shape configured to follow contours of the oral anatomy, wherein forming the at least one segment comprises:
  depositing a layer comprising parylene on the model, wherein the layer comprises a majority of parylene, and
  using the layer comprising parylene to form a core component of the at least one segment.

16. The method of claim 15, wherein forming a dental article further comprises:
   after depositing the layer comprising parylene on the model, trimming the layer to a selected shape to form the core component; and
   separating the core component from the model.

17. The method of claim 15, wherein depositing a layer comprising parylene on the model comprises chemical vapor depositing the layer comprising parylene.

18. The method of claim 15, wherein forming the dental article comprises forming a dental tray aligner, a night guard, a dental attachment, a retainer, a palatal expander, or a mouth guard.

19. The method of claim 15, further comprising coating the core component with an inorganic material or a polymeric hardcoat, wherein the inorganic material comprises at least one of a metal, a metal alloy, a metal oxide, a metal salt, a ceramic, a glass, or a mineral.

20. A method comprising:
   receiving, by a computing device, a digital representation of a three-dimensional (3D) oral anatomy of a patient, the oral anatomy providing initial positions of one or more teeth of the patient;
   determining, by the computing device, dimensions and shapes for a dental article for the patient, wherein the dental article comprises at least one segment configured to at least partially surround a plurality of teeth to define complex 3D shape configured to follow contours of the oral anatomy, wherein the dimensions and shapes of the dental article are configured to reposition the one or more teeth of the patient from their initial positions to adjusted positions when the dental article is worn by the patient;
   forming a 3D model of an oral anatomy based on the dimensions and shapes for the dental article; and
   forming the dental article, wherein forming the at least one segment of the dental article comprises:
      depositing a layer comprising parylene on the 3D model, wherein the layer comprises a majority of parylene, and
      trimming the layer comprising parylene to a selected shape to form a core component of the at least one segment.

* * * * *